(12) United States Patent
Fukata et al.

(10) Patent No.: US 9,189,691 B2
(45) Date of Patent: Nov. 17, 2015

(54) THREE-DIMENSIONAL OBJECT DETECTION DEVICE AND THREE-DIMENSIONAL OBJECT DETECTION METHOD

(71) Applicant: Nissan Motor Co., Ltd., Yokohama-shi, Kanagawa (JP)

(72) Inventors: Osamu Fukata, Commerce Township, MI (US); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/409,501

(22) PCT Filed: Jul. 25, 2013

(86) PCT No.: PCT/JP2013/070222
§ 371 (c)(1),
(2) Date: Dec. 19, 2014

(87) PCT Pub. No.: WO2014/017600
PCT Pub. Date: Jan. 30, 2014

(65) Prior Publication Data
US 2015/0178575 A1      Jun. 25, 2015

(30) Foreign Application Priority Data
Jul. 27, 2012   (JP) .................................. 2012-166517

(51) Int. Cl.
*G06K 9/00* (2006.01)
*H04N 7/18* (2006.01)
(Continued)

(52) U.S. Cl.
CPC ........ *G06K 9/00805* (2013.01); *G06K 9/00214* (2013.01); *G06T 7/004* (2013.01); *G06T 7/2086* (2013.01); *G08G 1/166* (2013.01); *G08G 1/167* (2013.01); *H04N 7/18* (2013.01); *H04N 7/188* (2013.01); *G06T 2207/10016* (2013.01);
(Continued)

(58) Field of Classification Search
None
See application file for complete search history.

(56) References Cited

U.S. PATENT DOCUMENTS

2004/0143380 A1\*  7/2004  Stam ...................... B60Q 1/085
                                                              701/36
2006/0030984 A1\*  2/2006  Kamiya .................. G08G 1/20
                                                              701/31.4

(Continued)

FOREIGN PATENT DOCUMENTS

| EP | 1962254 A2 | 8/2008 |
|---|---|---|
| EP | 2400315 A1 | 12/2011 |

(Continued)

*Primary Examiner* — Hadi Akhavannik
(74) *Attorney, Agent, or Firm* — Global IP Counselors, LLP

(57) ABSTRACT

A three-dimensional object detection device has an image capturing unit, a three-dimensional object detection unit, a host vehicle speed detection unit, a light source detection unit and a controller. The image capturing unit captures images rearward of a vehicle. The three-dimensional object detection unit detects a presence of a three-dimensional object in a detection area, based on the captured images. The host vehicle speed detection unit detects a vehicle traveling speed. The light source detection unit detects a headlight light source of a headlight of another vehicle. The controller compares the traveling speeds of the object and the vehicle upon not detecting the headlight light source, and suppresses detection of the object upon determining one of the object traveling speed being equal to or less than the vehicle traveling speed, and a difference between the object and vehicle traveling speeds being less than a predetermined value.

14 Claims, 23 Drawing Sheets

(51) Int. Cl.
*G08G 1/16* (2006.01)
*G06T 7/00* (2006.01)
*G06T 7/20* (2006.01)

(52) U.S. Cl.
CPC ............... *G06T2207/10028* (2013.01); *G06T 2207/20221* (2013.01); *G06T 2207/30252* (2013.01)

(56) References Cited

U.S. PATENT DOCUMENTS

| 2006/0125919 | A1 | 6/2006 | Camilleri et al. | |
|---|---|---|---|---|
| 2009/0187343 | A1* | 7/2009 | Koch-Groeber | B60K 35/00 701/301 |
| 2011/0205042 | A1* | 8/2011 | Takemura | G08G 1/166 340/435 |
| 2013/0027511 | A1* | 1/2013 | Takemura | G06K 9/00805 348/42 |

FOREIGN PATENT DOCUMENTS

| JP | 5-151495 A | 6/1993 |
|---|---|---|
| JP | 2004-341812 A | 12/2004 |
| JP | 2008-219063 A | 9/2008 |
| JP | 2008-227646 A | 9/2008 |
| JP | 2008-282067 A | 11/2008 |
| JP | 2012-3662 A | 1/2012 |

* cited by examiner

THREE-DIMENSIONAL OBJECT DETECTION DEVICE AND THREE-DIMENSIONAL OBJECT DETECTION METHOD

CROSS-REFERENCE TO RELATED APPLICATIONS

This application is a U.S. National stage application of International Application No. PCT/JP2013/070222, filed Jul. 25, 2013, which claims priority to Japanese Patent Application No. 2012-166517 filed in Japan on Jul. 27, 2012. The entire disclosure of Japanese Patent Application No. 2012-166517 is hereby incorporated herein by reference.

BACKGROUND

1. Field of the Invention

The present invention relates to a three-dimensional object detection device and a three-dimensional object detection method.

2. Background Information

In a conventionally known technique, two captured images captured at different points in time are converted to bird's-eye view images, and a three-dimensional object is detected based on differences between the two converted bird's-eye view images (see Japanese Laid-Open Patent Application No. 2008-227646).

SUMMARY

When detecting three-dimensional objects present in adjacent lanes as adjacent vehicles based on captured images captured by a camera, there are instances in which, due to low luminance of the surroundings, it is difficult to detect adjacent vehicles and other three-dimensional objects. Particularly in cases in which mud or other foreign matter has become deposited on the camera lens, it is possible that a silhouette of the mud or other foreign matter deposited on the lens will stand out due to surrounding light environment, and that the mud or other foreign matter deposited on the lens will thereby be misdetected as an adjacent vehicle, making it difficult to detect adjacent vehicles and other such three-dimensional objects.

The problem to be solved by the present invention is to provide a three-dimensional object detection device that effectively prevents errant detection of adjacent vehicles in cases in which mud or other foreign matter is deposited on the lens.

Means Used to Solve the Above-Mentioned Problems

The present invention solves the above-mentioned problem through a constitution whereby, in the event that no light source corresponding to a headlight of an adjacent vehicle is detected, the travel speed of a detected three-dimensional object and the travel speed of a host vehicle are compared, and in the event that the travel speed of the three-dimensional object is equal to or less than the travel speed of the host vehicle, or in the event that the difference between the travel speed of the three-dimensional object and the travel speed of the host vehicle is equal to or less than a prescribed value, assessment of the three-dimensional object as being an adjacent vehicle is suppressed.

According to the present invention, in the event that no light source corresponding to a headlight of an adjacent vehicle is not detected, the travel speed of the detected a three-dimensional object and the travel speed of a host vehicle are compared, and in the event that the travel speed of the three-dimensional object is equal to or less than the travel speed of the host vehicle, or in the event that the difference between the travel speed of the three-dimensional object and the travel speed of the host vehicle is equal to or less than a prescribed value, assessment of the three-dimensional object as being an adjacent vehicle is suppressed, whereby even when mud or other foreign matter is deposited on the lens, errant detection of such foreign matter as being an adjacent vehicle can be effectively prevented.

BRIEF DESCRIPTION OF THE DRAWINGS

Referring now to the attached drawings which form a part of this original disclosure.

DETAILED DESCRIPTION OF THE EMBODIMENTS

Figure 1:
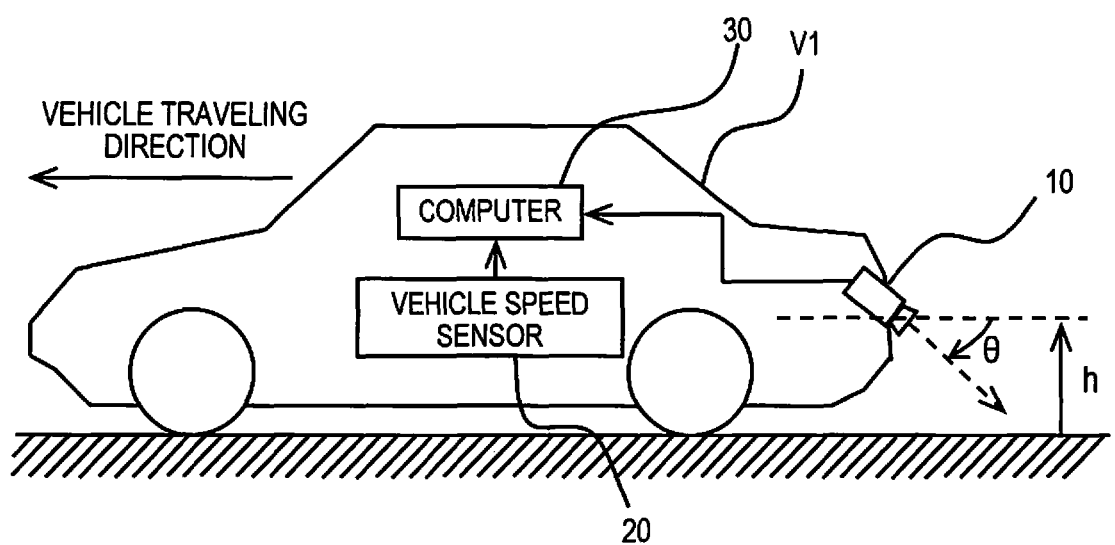
FIG. 1 is a schematic overview of a vehicle in which a three-dimensional object detection device has been mounted.

FIG. 1 is a schematic overview of a vehicle in which a three-dimensional object detection device 1 according to the present embodiment has been mounted. An object of the three-dimensional object detection device 1 according to the present embodiment is to detect another vehicle (hereinbelow also referred to as an "adjacent vehicle V2") present in an adjacent lane, such that contact is possible, should a host vehicle V1 change lanes. The three-dimensional object detection device 1 according to the present embodiment is provided with a camera 10, a vehicle speed sensor 20, and a computer 30, as illustrated in FIG. 1.

The camera 10 is attached to the host vehicle V1 in such a way that the optical axis is oriented at an angle θ downward from the horizontal, at a location at a height h at the rear of the host vehicle V1, as illustrated in FIG. 1. From this position, the camera 10 captures images of a predetermined area of the surrounding environment of the host vehicle V1. The vehicle speed sensor 20 detects the travel speed of the host vehicle V1, and calculates the vehicle speed from wheel speed detected, e.g., by a wheel speed sensor which detects the rotational speed of a wheel. The computer 30 detects adjacent vehicles present in adjacent lanes rearward of the host vehicle.

Figure 2:
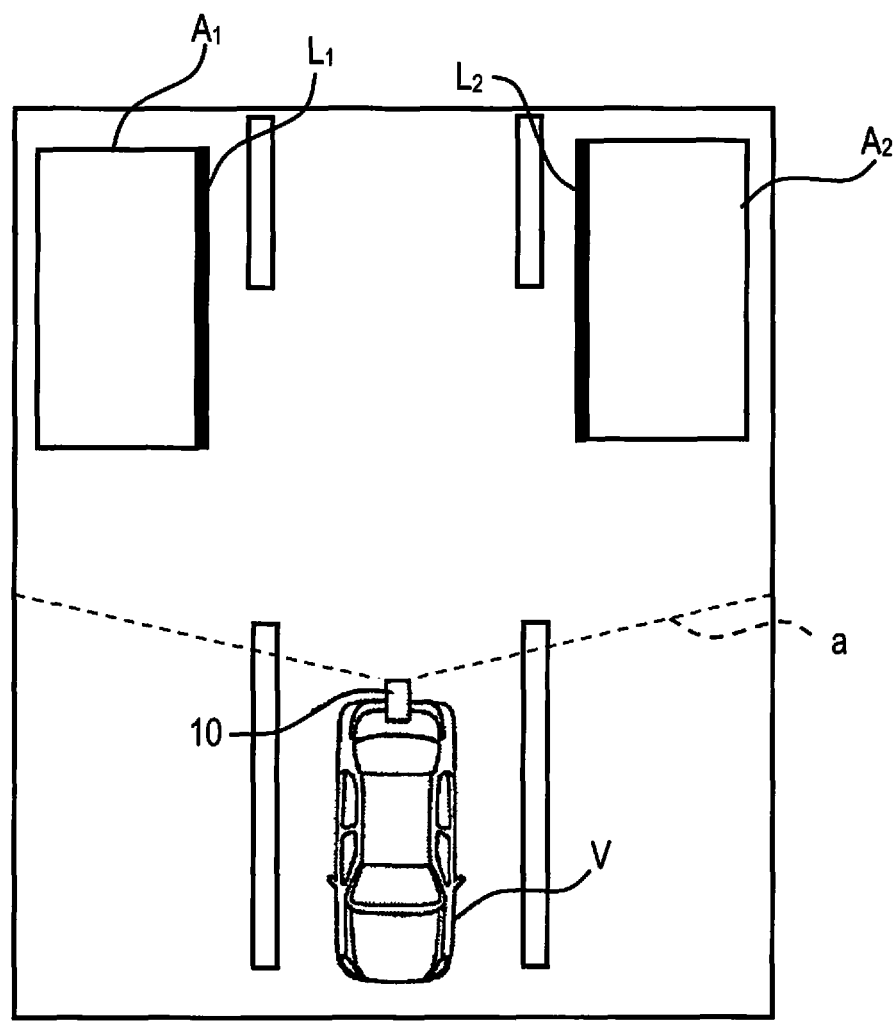
FIG. 2 is a plan view of the traveling state of the vehicle in FIG. 1.

FIG. 2 is a plan view of the traveling state of the host vehicle V1 in FIG. 1. As illustrated in the drawing, the camera 10 captures images to the rear of the vehicle at a predetermined view angle a. At this time, the view angle a of the camera 10 is set to a view angle such that it is possible for images of lanes to the left and right (adjacent lanes) to be captured, in addition to images of the lane in which the host vehicle V1 is traveling. This area of possible image capture includes areas to be detected A1, A2 located to the rear of the host vehicle V1, in adjacent lanes situated adjacently to the left and right of the lane traveled by the host vehicle V1. In the present embodiment, "rear of the vehicle" refers not only to the area directly behind the vehicle, but includes areas lying to the side at the rear side of the vehicle. The area to the rear of the vehicle in which images are captured is set according to the view angle of the camera 10. As one example, where the direction directly rearward of the vehicle in the vehicle lengthwise direction is designated as 0 degrees, the area may be set to include an area of from 0 to 90 degrees, preferably from 0 to 70 degrees, to the left and right from the direction directly rearward of the vehicle.

Figure 3:
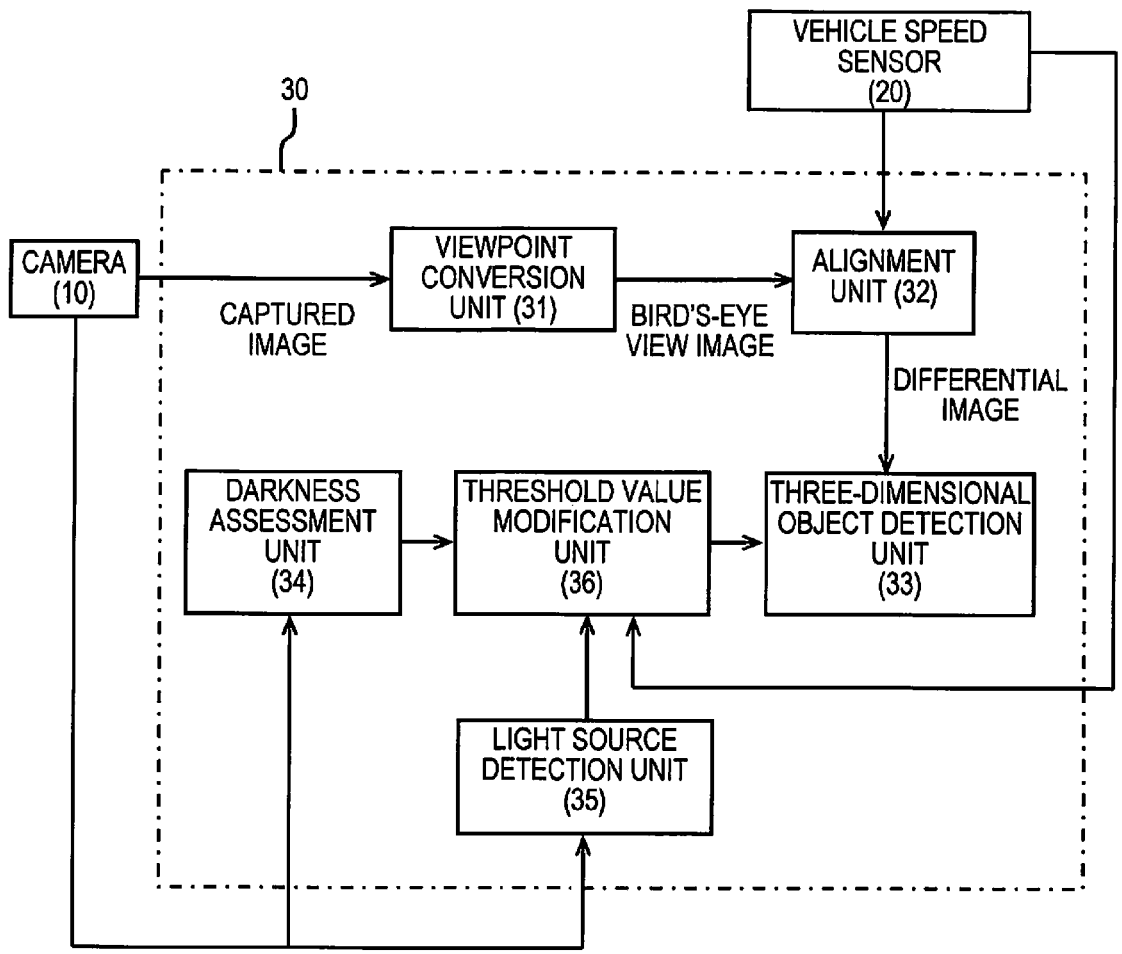
FIG. 3 is a block diagram of the details of a computer in FIG. 1.

FIG. 3 is a block view of the details of the computer 30 of FIG. 1. The camera 10 and the vehicle speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, a darkness assessment unit 34, a light source detection unit 35, and a threshold value modification unit 36. The configuration of these units is described below.

Captured image data of a predetermined area, obtained through image capture by the camera 10, is input to the viewpoint conversion unit 31, and the inputted captured image data undergoes viewpoint conversion to bird's-eye view image data of a bird's-eye view state. A bird's-eye view state refers to a state of viewing from a viewpoint of an imaginary camera looking down from midair, e.g., vertically downward. This viewpoint conversion can be executed in the manner disclosed, e.g., in Japanese Laid-Open Patent Application No. 2008-219063. The reason for viewpoint conversion of captured image data to bird's-eye view image data is based on the principle that, through viewpoint conversion to bird's-eye view image data, perpendicular edges unique to a three-dimensional object are converted to a straight-line group that passes through a specific fixed point, and that this principle can be utilized to differentiate planar objects and three-dimensional objects.

Figure 4:
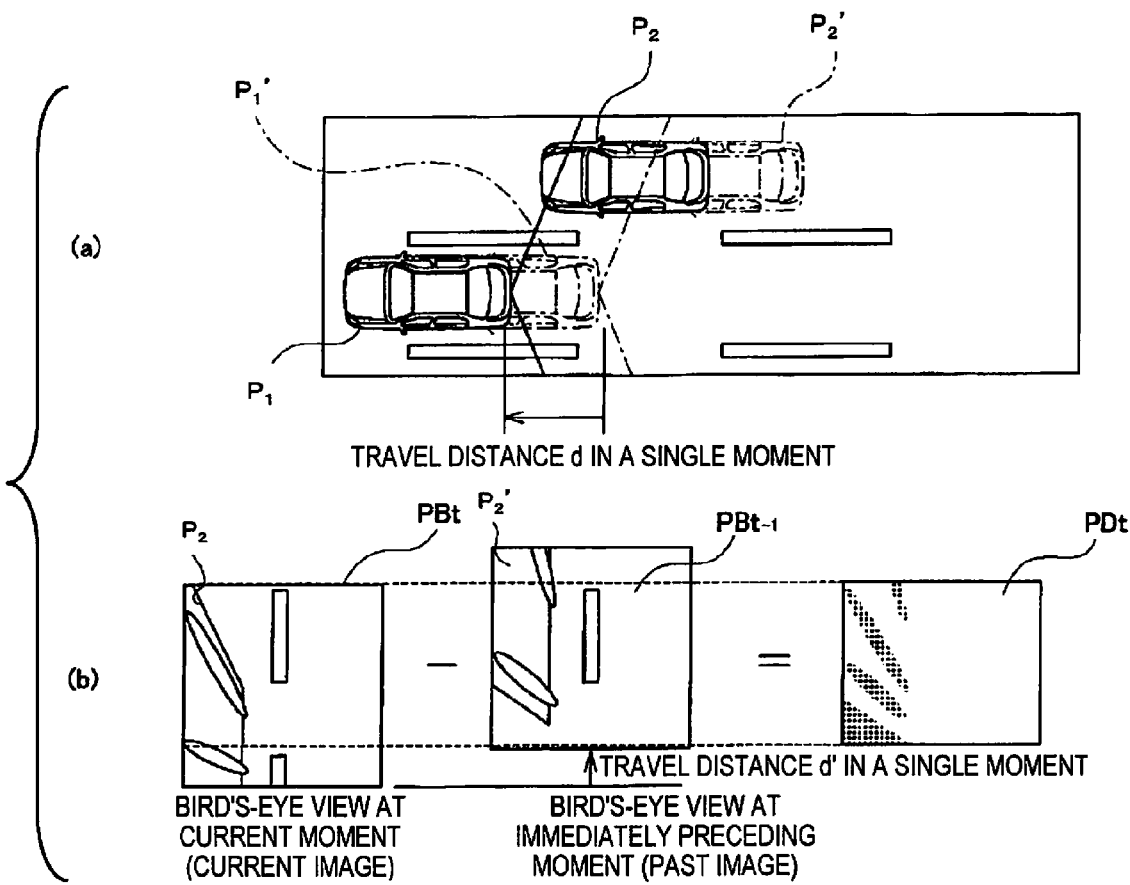
FIG. 4 is an explanatory view of a general overview of processing by the alignment unit, with part (a) of FIG. 4 being a plan view of the state of movement of the vehicle, and part (b) of FIG. 4 being an image illustrating a general overview of alignment.

The bird's-eye view image data obtained through viewpoint conversion by the viewpoint conversion unit 31 is sequentially inputted to the alignment unit 32, and the positions of the inputted bird's-eye view image data obtained at different points in time are aligned. FIG. 4 is a view of the general overview of processing by the alignment unit 32. Part (a) of FIG. 4 is a plan view of the state of movement of the host vehicle V1, and part (b) of FIG. 4 is an image illustrating a general overview of alignment.

It is assumed that, as illustrated in part (a) of FIG. 4, the host vehicle V1 at the current point in time is positioned at $P_1$, the host vehicle V1 having been positioned at $P_1'$ at the immediately preceding point in time. It is moreover assumed that an adjacent vehicle V2 is positioned in the rear-side direction from the host vehicle V1 and is travelling parallel to the host vehicle V1, and that the adjacent vehicle V2 at the current point in time is positioned at $P_2$, the adjacent vehicle V2 having been positioned at $P_2'$ at the immediately preceding point in time. It is further assumed that the host vehicle V1 has moved a distance d during a single point in time. The phrase "immediately preceding point in time" may refer to a past point in time of pre-established duration (e.g., a single control cycle) that precedes the current point in time, or a past point in time of any duration.

In such a state, a bird's-eye view image $PB_t$ at the current point in time appears as illustrated in part (b) of FIG. 4. Whereas the white lane stripes painted on the road surface are rectangular in this bird's-eye view image $PB_t$ and are relatively accurate in a plan view, the adjacent vehicle V2 (position $P_2$) experiences collapsing. Likewise, in the bird's-eye view image $PB_{t-1}$ at the immediately preceding point in time, the white lane stripes painted on the road surface are rectangular and are relatively accurate in plan view, whereas the adjacent vehicle V2 (position $P_2'$) experiences collapsing. As previously described, perpendicular edges of a three-dimensional object (including edges that rise up in three-dimensional space from the road surface, apart from perpendicular edges in the strict sense) appear as a straight-line group along a collapsing direction, due to the viewpoint conversion process to bird's-eye view image data, whereas because a planar image on the road surface does not include perpendicular edges, such collapsing does not occur, even with viewpoint conversion.

The alignment unit 32 executes alignment of the bird's-eye view images $PB_t$ and $PB_{t-1}$ such as those described above, on the data. When doing so, the alignment unit 32 offsets the bird's-eye view image $PB_{t-1}$ at the immediately preceding point in time, matching it in position to the bird's-eye view image $PB_t$ at the current point in time. The left-side image and the center image in part (b) of FIG. 4 illustrate a state of offset by a travel distance d'. The offset amount d' is the amount of movement in the bird's-eye view image data that corresponds to the actual travel distance d of the host vehicle V1 illustrated in part (a) of FIG. 4, and is selected based on a signal from the vehicle speed sensor 20, and the duration from the immediately preceding point in time to the current point in time.

In the present embodiment, the alignment unit 32 performs position alignment, in bird's-eye view, of the positions of bird's-eye view images captured at different points in time, and obtains a position-aligned bird's-eye view image. This "position alignment" process can be conducted at a degree of accuracy according to the type of target being detected and the required detection accuracy. For example, the position alignment process may be a strict one involving position alignment based on identical points in time and identical positions, or a looser position alignment process such that the coordinates of each bird's-eye view image may be ascertained.

After alignment, the alignment unit 32 takes the difference between the bird's-eye view images $PB_t$ and $PB_{t-1}$, and generates differential image $PD_t$ data. In the present embodiment, to compensate for variations in the illumination environment, the alignment unit 32 takes the absolute value of the difference between pixel values in the bird's-eye view images $PB_t$ and $PB_{t-1}$, and sets the pixel value in the differential image $PD_t$ to "1" when the absolute value is equal to or greater than a predetermined difference threshold value th, or sets the pixel value in the differential image $PD_t$ to "0" when the absolute value is less than a predetermined threshold value th, whereby differential image $PD_t$ data such as that illustrated on the right side of part (b) of FIG. 4 can be generated. In the present embodiment, there are instances in which the difference threshold value th will be modified by the threshold value modification unit 36, discussed below; in instances in which the difference threshold value th has been modified by the threshold value modification unit 36, the difference threshold value th that has been modified by the threshold value modification unit 36 is employed when detecting pixel values of the differential image $PD_t$.

Based on the differential image $PD_t$ data illustrated in part (b) of FIG. 4, the three-dimensional object detection unit 33 generates a differential waveform. In the process, the three-dimensional object detection unit 33 also calculates the travel distance of the three-dimensional object in real space. When detecting the three-dimensional object and calculating the travel distance, the three-dimensional object detection unit 33 first generates a differential waveform.

When generating the differential waveform, the three-dimensional object detection unit 33 establishes a detection area (detection frame) in the differential image $PD_t$. An object of the three-dimensional object detection device 1 of the present example is to calculate the travel distance of an adjacent vehicle with which there is a possibility of contact should the host vehicle V1 change lanes. Accordingly, in the present example, rectangular detection areas (detection frames) A1, A2 of rectangular shape are established to the rear side of the host vehicle V1, as illustrated in FIG. 2. Such detection areas A1, A2 may be established from a relative position with respect to the host vehicle V1, or may be established based on the positions of the white lane stripes. When setting the areas based on the positions of the white lane stripes, the three-dimensional object detection device 1 may use, e.g., an existing white lane stripe recognition technique.

The three-dimensional object detection unit 33 recognizes the borders of the thusly established detection areas A1, A2 on the sides of the host vehicle V1 (borders lying along the traveling direction) to be ground contact lines L1, L2, as illustrated in FIG. 2. Generally, a ground contact line means a line at which a three-dimensional object contacts the ground; in the present embodiment, however, ground contact lines are not lines of contact with the ground, but rather have been set in the manner described above. In this case as well, experience has shown that differences between ground contact lines according to the present embodiment and the ground contact lines determined in the normal fashion from the position of the adjacent vehicle V2 are not very large, and pose no problem in actual practice.

Figure 5:
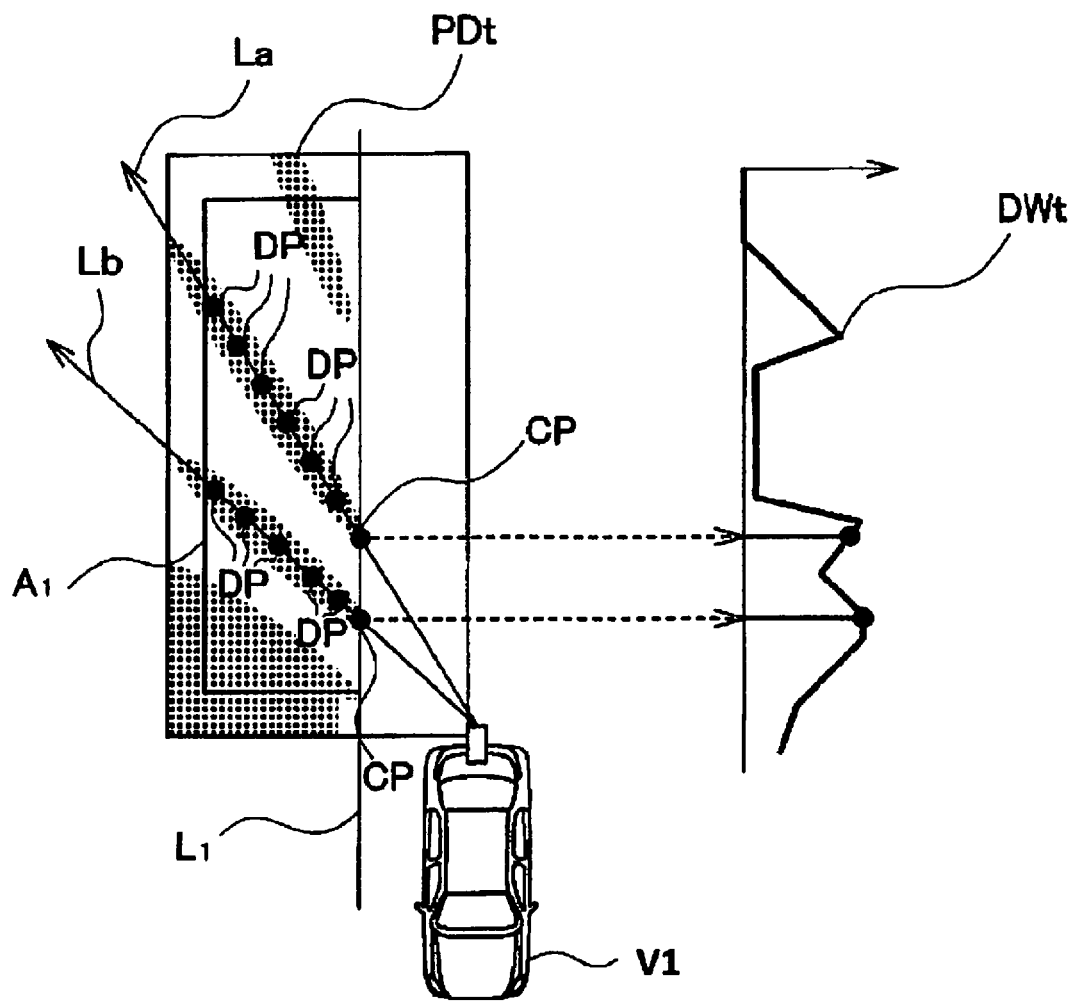
FIG. 5 is a schematic view of the manner in which a differential waveform is generated by the three-dimensional object detection unit.

FIG. 5 is a schematic view of the manner in which a differential waveform is generated by the three-dimensional object detection unit 33. As illustrated in FIG. 5, the three-dimensional object detection unit 33 generates a differential waveform $DW_t$ from portions corresponding to the detection areas A1, A2 in the differential image $PD_t$ (drawing on the right in part (b) of FIG. 4) calculated by the alignment unit 32. In this case, the three-dimensional object detection unit 33 generates the differential waveform $DW_t$ in the direction of collapsing of the three-dimensional object resulting from the viewpoint conversion. In the example illustrated in FIG. 5, only the detection area A1 will be described for the sake of convenience, but the differential waveform $DW_t$ is generated for the detection area A2 as well, using the same procedure.

More specifically, firstly, the three-dimensional object detection unit 33 defines a line La in the direction of collapsing of the three-dimensional object in the differential image $PD_t$ data. The three-dimensional object detection unit 33 then counts the number of difference pixels DP indicating a predetermined difference, on the line La. In the present embodiment, the difference pixels DP indicating a predetermined difference have differential image $PD_t$ pixel values represented by "0" or "1," with pixels indicated by "1" being counted as difference pixels DP.

The three-dimensional object detection unit 33, after counting the number of difference pixels DP, then determines a crossing point CP of the line La and the ground contact line L1. The three-dimensional object detection unit 33 then associates the crossing point CP and the count number, and based on the position of the crossing point CP, selects a horizontal-axis position, i.e., a position on the axis in the vertical direction in the drawing on the right in FIG. 5; from the count number, selects a vertical-axis position, i.e., a position on the axis in the lateral direction in the drawing on the right in FIG. 5; and plots a position as the count number at the crossing point CP.

In like fashion, the three-dimensional object detection unit 33 subsequently defines lines Lb, Lc, . . . in the direction of collapsing of the three-dimensional object, counts the number of difference pixels DP, selects a horizontal-axis position based on the position of each crossing point CP, selects a vertical-axis position from the count number (the number of difference pixels DP), and plots a position. The three-dimensional object detection unit 33 repeats the above procedure in succession to form a frequency distribution, thereby generating a differential waveform $DW_t$ as illustrated in the drawing at right in FIG. 5.

Here, the difference pixels PD in the differential image $PD_t$ data are pixels exhibiting change across images captured at different points in time, in other words, locations where it is thought that a three-dimensional object was present. Accordingly, in locations where a three-dimensional object was present, the number of pixels is counted along the direction of collapsing of the three-dimensional object, forming a frequency distribution and thereby generating a differential waveform $DW_t$. In particular, because the number of pixels is counted along the direction of collapsing of the three-dimensional object, the differential waveform $DW_t$ is generated from information pertaining to the height direction in relation to the three-dimensional object.

The line La and the line Lb in the direction of collapsing of the three-dimensional object overlap the detection area A1 by different distances, as illustrated in the drawing on the left in FIG. 5. Accordingly, when it is assumed that the detection area A1 is filled with the difference pixels DP, the number of difference pixels DP will be greater on the line La than on the line Lb. For this reason, when selecting a vertical-axis position from the count number of the difference pixels DP, the three-dimensional object detection unit 33 performs normalization based on the distances of overlap between the lines La, Lb and the detection area A1, in the direction of collapsing of the three-dimensional object. As a specific example, in the drawing on the left in FIG. 5, there are six difference pixels DP on the line La and live difference pixels DP on the line Lb. Accordingly, when a vertical-axis position is selected from the count number in FIG. 5, the three-dimensional object detection unit 33 performs normalization by dividing the count number by the overlap distance, or the like. The values of the differential waveform $DW_t$ that correspond to the lines La, Lb in the direction of collapsing of the three-dimensional object are thereby made substantially identical, as shown by the differential waveform $DW_t$.

Figure 6:
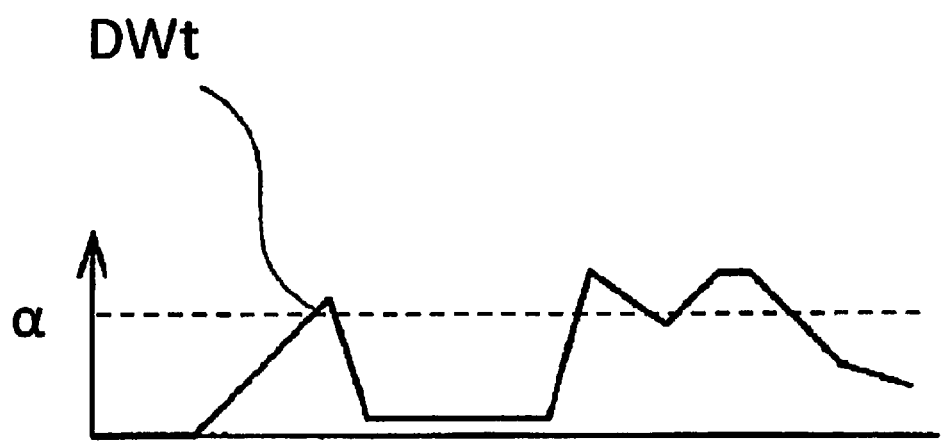
FIG. 6 is a view of an example of a differential waveform and a threshold value $\alpha$ for detecting a three-dimensional object.

After generating the differential waveform $DW_t$, the three-dimensional object detection unit 33 performs detection of adjacent vehicles present in adjacent lanes. FIG. 6 is a view of a method for detecting three-dimensional objects by the three-dimensional object detection unit 33, and illustrates an example of the differential waveform $DW_t$ and a threshold value α for detecting a three-dimensional object. As illustrated in FIG. 6, the three-dimensional object detection unit 33, assesses whether a peak of the generated differential waveform $DW_t$ is equal to or greater than the predetermined threshold value α which corresponds to the peak position of the differential waveform $DW_t$ in question, and thereby assesses whether a three-dimensional object is present in the detection areas A1, A2. Then, in the event that the peak of the differential waveform $DW_t$ is less than the predetermined threshold value α, the three-dimensional object detection unit 33 assesses that no three-dimensional object is present in the detection areas A1, A2; or in the event that the peak of the differential waveform $DW_t$ is equal to or greater than the predetermined threshold value α, assesses that a three-dimensional object is present in the detection areas A1, A2.

The three-dimensional object detection unit 33 further calculates the traveling speed of the three-dimensional object by comparing the differential waveform $DW_t$ at the current point in time and the differential waveform $DW_{t-1}$ at the immediately preceding point in time. In other words, the three-dimensional object detection unit 33 calculates the traveling speed of the three-dimensional object from temporal change of the differential waveform $DW_t$ and the differential waveform $DW_{t-1}$.

Figure 7:
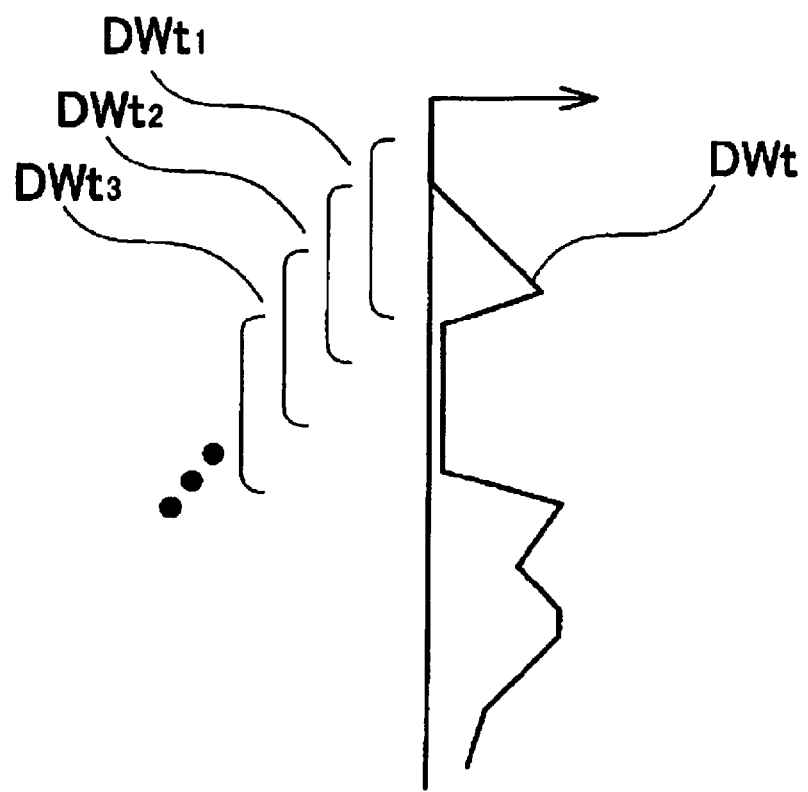
FIG. 7 is a view of small areas divided by the three-dimensional object detection unit.

More specifically, the three-dimensional object detection unit 33 divides the differential waveform $DW_t$ into a plurality of small areas $DW_{t-1}$ to $DW_{tn}$ (where n is any integer equal to or greater than 2, as illustrated in FIG. 7. FIG. 7 is a view of the small areas $DW_{t1}$ to $DW_{tn}$ which have been divided by the three-dimensional object detection unit 33. The small areas $DW_{t1}$ to $DW_{tn}$ are divided so as to mutually overlap, as illustrated in, e.g., FIG. 7. For example, the small area $DW_{t1}$ and the small area $DW_{t2}$ overlap, and the small area $DW_{t2}$ and the small area $DW_{t3}$ overlap.

Next, the three-dimensional object detection unit 33 determines an offset amount (an amount of movement in the horizontal-axis direction (vertical direction in FIG. 7) of the differential waveform) for each of the small areas $DW_{t1}$ to $DW_{tn}$. Here, the offset amount is determined from the difference (distance in the horizontal-axis direction) between the differential waveform $DW_{t-1}$ at the immediately preceding point in time and the differential waveform $DW_t$ at the current point in time. In the process, having moved the differential waveform $DW_{t-1}$ at the immediately preceding point in time in the horizontal-axis direction for each of the small areas $DW_{t1}$ to $DW_{tn}$, the three-dimensional object detection unit 33 assesses the position (the position in the horizontal-axis direction) at which error in relation to the differential waveform $DW_t$ at the current point in time is minimized, and determines as the offset amount a movement amount in the horizontal-axis direction, between the original position of the differential waveform $DWt_{-1}$ and the position at which error is minimized. The three-dimensional object detection unit 33 then counts the offset amounts determined for each of the small areas $DW_{t1}$ to $DW_{tn}$ to form a histogram.

Figure 8:
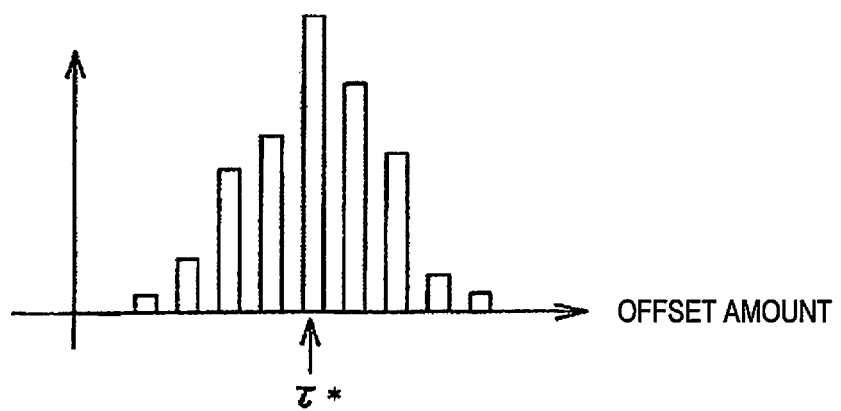
FIG. 8 is a view of an example of a histogram obtained by the three-dimensional object detection unit.

FIG. 8 is a view of an example of a histogram obtained by the three-dimensional object detection unit 33. As illustrated in FIG. 8, some amount of variability occurs in the offset amount, which represents the travel distance minimizing error between each of the small areas $DW_{t1}$ to $DW_{tn}$ and the differential waveform $DW_{t-1}$ at the immediately preceding point in time. Accordingly, the three-dimensional object detection unit 33 creates a histogram from the offset amount which includes variability, v, and calculates the travel distance from the histogram. In the process, the three-dimensional object detection unit 33 calculates the travel distance of the three-dimensional object (the adjacent vehicle V2) from the maximum value in the histogram. In other words, in the example illustrated in FIG. 8, the three-dimensional object detection unit 33 calculates an offset amount indicating the maximum value of the histogram, by way of travel distance τ*. In this manner, in the present embodiment, even when there is variability in the offset amounts, it is possible to calculate a more highly accurate travel distance from the maximum value thereof. The travel distance τ* is the relative travel distance of the three-dimensional object (the adjacent vehicle V2) with respect to the host vehicle. Accordingly, when calculating an absolute travel distance, the three-dimensional object detection unit 33 calculates the absolute travel distance based on the travel distance τ* thus obtained and a signal from the vehicle speed sensor 20.

In this manner, in the present embodiment, by calculating the travel distance of the three-dimensional object (the adjacent vehicle V2) from the offset amount of the differential waveform $DW_t$ when the error in the differential waveforms DWt generated at different points in time is minimized, the travel distance can be calculated from the offset amount, which represents one-dimensional information, i.e., a waveform, and computation costs incurred in calculating the travel distance can be kept low. Also, by dividing the differential waveforms DWt generated at different points in time into a plurality of small areas $DWt_1$ to $DWt_n$, a plurality of waveforms representing respective locations of a three-dimensional object can be obtained, thereby allowing an offset amount to be determined for each respective location of the three-dimensional object, and allowing travel distance to be determined from a plurality of offset amounts, whereby the accuracy of calculation of the travel distance can be improved. Moreover, in the present embodiment, the travel distance of the three-dimensional object is calculated from temporal change of the differential waveform DWt which includes height direction information. Consequently, as compared with the case of focusing solely on movement of a single point, the detection location prior to temporal change and the detection location after the temporal change are specified in a manner that includes height direction information, and accordingly are likely to be at the same location in the three-dimensional object; and because the travel distance is calculated from temporal change of the same location, the accuracy of calculation of the travel distance can be improved.

Figure 9:
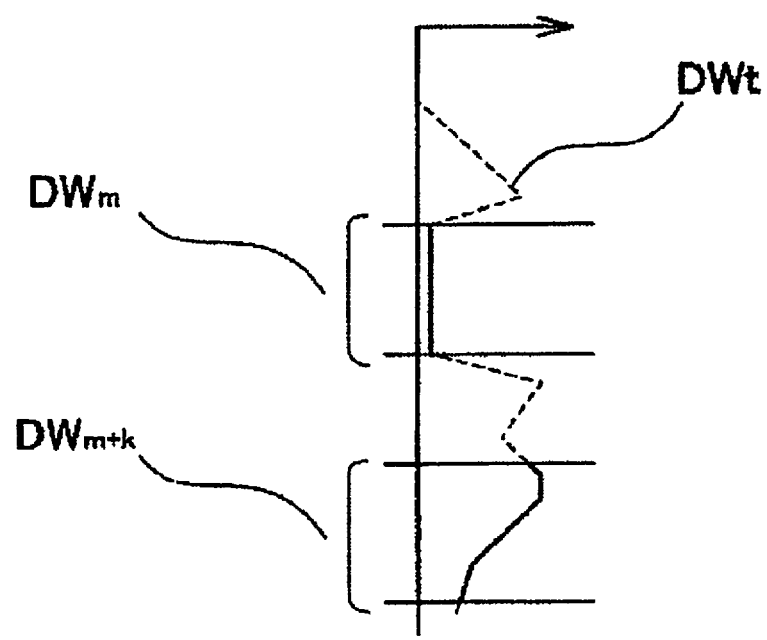
FIG. 9 is a view of weighting used by the three-dimensional object detection unit.

When creating a histogram, it is acceptable for the three-dimensional object detection unit 33 to perform weighting of each of the plurality of small areas $DWt_1$ to $DWt_n$, and in accordance with the weights, to count the offset amount determined for each of the small areas $DWt_1$ to $DWt_n$, creating the histogram. FIG. 9 is a view of weighting used by the three-dimensional object detection unit 33.

As illustrated in FIG. 9, a small area $DW_m$ (where m is an integer 1 or greater and n−1 or less) is flat. In other words, in the small area $DW_m$, the difference between the maximum and minimum values of the count of number of pixels indicating a predetermined difference is small. The three-dimensional object detection unit 33 reduces the weight assigned to this type of small area $DW_m$. The reason is that the flat small area $DW_m$ is featureless, and there is a high probability that errors will be magnified when calculating the offset amount.

On the other hand, a small area $DW_{m+k}$ (where k is an integer equal to n−m or less) contains numerous undulations. In other words, in the small area $DW_m$, there is considerable difference between the maximum and minimum values of the count of number of pixels exhibiting a predetermined difference. The three-dimensional object detection unit 33 increases the weight assigned to this type of small area $DW_m$. The reason is that the small area $DW_{m+k}$ containing numerous undulations has features, and there is a high probability that the offset amount will be accurately calculated. By assigning weights in this manner, it is possible to enhance the accuracy of calculation of the travel distance.

In the aforedescribed embodiment, the differential waveform DWt is divided into a plurality of small areas $DWt_1$ to $DWt_n$ in order to enhance the accuracy of calculation of travel distance, but division into the small areas $DWt_1$ to $DWt_n$ need not take place in cases in which such high accuracy of calculation of travel distance is not needed. In this case, the three-dimensional object detection unit 33 would calculate the travel distance from the offset amount of the differential waveform DWt, at which error between the differential waveform DWt and the differential waveform $DWt_{-1}$ is minimized. In other words, the method by which an offset amount between the differential waveform $DWt_{-1}$ at the immediately preceding point in time and the differential waveform DWt at the current point in time is determined is that described above.

In the present embodiment, the three-dimensional object detection unit 33 determines the traveling speed of the host vehicle V1 (the camera 10), and determines an offset amount for a stationary object from the traveling speed so determined. After determining the offset amount of the stationary object, the three-dimensional object detection unit 33 calculates the travel distance of the three-dimensional object, while disregarding any offset amount that, of the maximum values of a histogram, corresponds to that of a stationary object.

Figure 10:
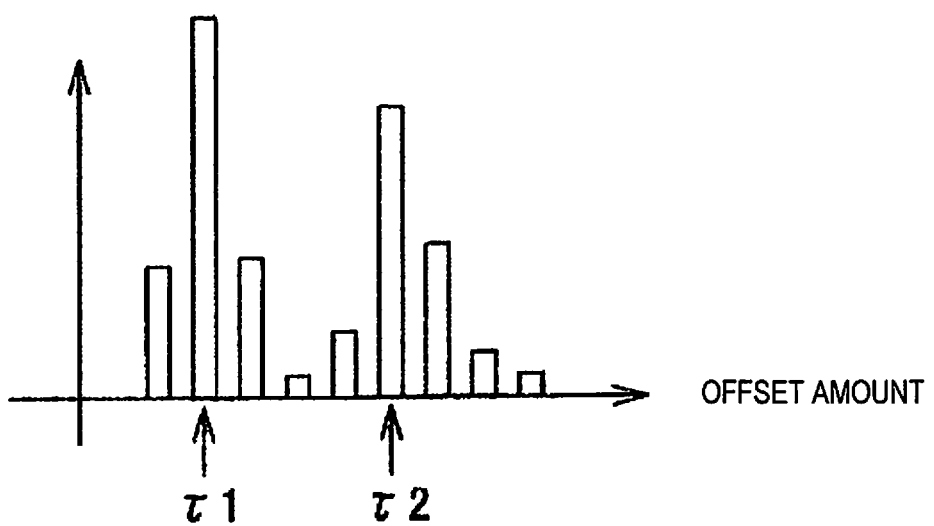
FIG. 10 is a view of another example of a histogram obtained by the three-dimensional object detection unit.

FIG. 10 is a view of another example of a histogram obtained by the three-dimensional object detection unit 33. When a stationary object is present in addition to a three-dimensional object within the view angle of the camera 10, two maximum values r1, r2 appear in the resulting histogram. In this case, one of the two maximum values r1, r2 represents the offset amount of the stationary object. Consequently, from the traveling speed, the three-dimensional object detection unit 33 determines an offset amount for the stationary object, and uses the remaining maximum value to calculate the travel distance of the three-dimensional object, while disregarding the maximum value that corresponds to that offset amount. It is thereby possible to prevent a situation in which the accuracy of calculation of the travel distance of the three-dimensional object is reduced due to the stationary object.

Even when the offset amount corresponding to the stationary object is disregarded, in cases in which there are a plurality of maximum values, it may be hypothesized that a plurality of three-dimensional objects may be present within the view angle of the camera 10. However, it is exceedingly rare for a plurality of three-dimensional objects to be present within the detection areas A1, A2. Accordingly, the three-dimensional object detection unit 33 suspends calculation of the travel distance. In the present embodiment, it is possible thereby to prevent situations, such as when there are a plurality of maximum values, in which an erroneous travel distance might be calculated.

Based on a captured image captured by the camera 10, the darkness assessment unit 34 makes an assessment as to whether it is currently dark. Specifically, the darkness assessment unit 34 calculates the average luminance of the entire captured image, as well as detecting high-luminance areas that have a luminance difference, relative to the surroundings, which is equal to or greater than a predetermined value, and that have predetermined planar dimensions or greater, to be light sources. Then, in the event that the darkness assessment unit 34 detects that the average luminance of the entire captured image is equal to or less than the predetermined value, and moreover detects a predetermined quantity (predetermined number) or more of light sources within a predetermined time, assesses that it is currently dark. In this way, the darkness assessment unit 34 makes the assessment not only in relation to the luminance of the entire captured image, but also in relation to whether light sources are present, whereby errant assessment of darkness, e.g., due to the absence of light sources, such as the headlights of other vehicles or streetlights, in the environs of the host vehicle V1 at dusk can be effectively prevented.

Figure 11:
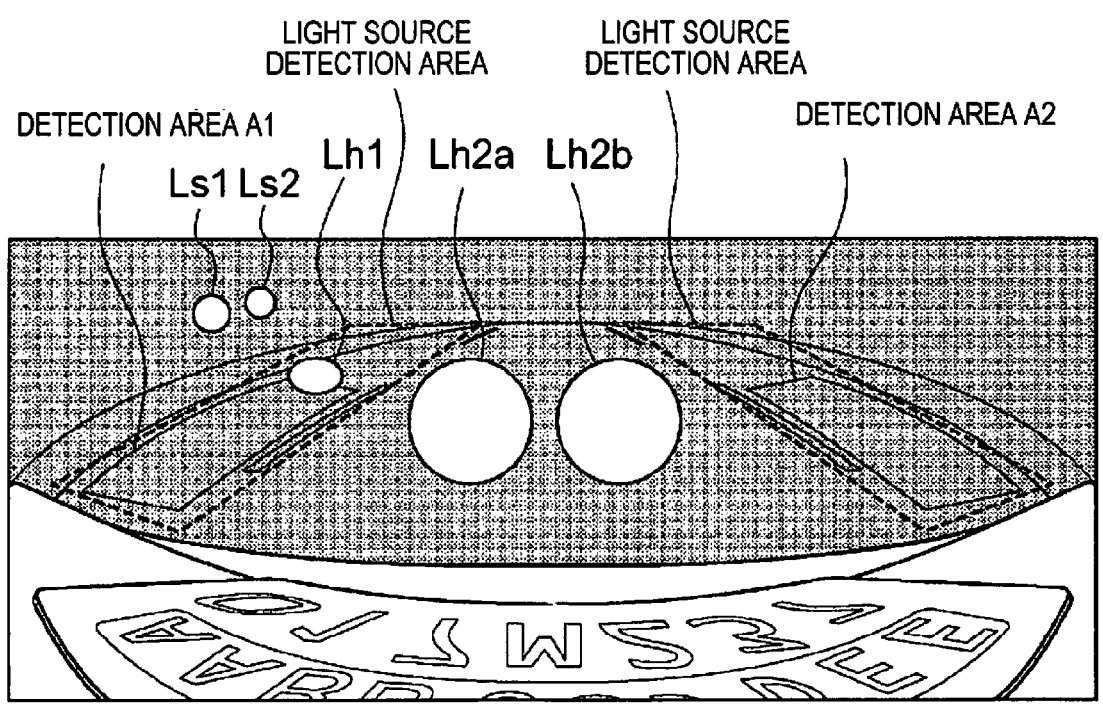
FIG. 11 is a view describing a light source detection area.

As illustrated in FIG. 11, the light source detection unit 35 performs detection of a light source corresponding to a headlight of an adjacent vehicle V2 within a predetermined light source detection area to the rear of the host vehicle. FIG. 11 is a view of the light source detection area, and illustrates an example of a captured image captured in the dark. The light source detection unit 35 establishes, as the light source detection area, an area that includes the detection areas A1, A2, and in which, in the event that the adjacent vehicle V2 is present in an adjacent lane, the headlight of the adjacent vehicle V2 will be detected, but light sources such as headlights of a following vehicle traveling in the lane traveled by the host vehicle V1, streetlights, and the like, will not be detected. For example, in the example illustrated in FIG. 11, there are shown by way of example a headlight Lh1 of the adjacent vehicle V2; streetlights Ls1, Ls2 located off the road; and headlights Lh2a, Lh2b of a following vehicle traveling in the lane traveled by the host vehicle. As illustrated in FIG. 11, the light source detection unit 35 establishes, as the light source detection area, an area in which the headlight Lh of the adjacent vehicle V2 is detected, but the streetlights Ls1, Ls2 located off the road, and the headlights Lh2a, Lh2b of the following vehicle traveling in the lane traveled by the host vehicle, are not detected. The light source detection unit 35 then detects, as a potential area that corresponds to the headlight of the adjacent vehicle V2, an image area within the established light source detection area, the image area differing in brightness from the surroundings by a predetermined value or more, and having a size equal to greater than predetermined planar dimensions, to thereby detect the light source corresponding to the headlight of the adjacent vehicle V2. The light source detection unit 35 repeatedly carries out detection of the light source corresponding to the headlight of the adjacent vehicle V2, in a predetermined cycle.

In the event that an assessment of darkness has been made by the darkness assessment unit 34, and moreover no light source corresponding to the headlight of the adjacent vehicle V2 has been detected by the light source detection unit 35, the threshold value modification unit 36 modifies a difference threshold value th for detecting three-dimensional objects, in order to prevent mud or other foreign matter deposited on the lens from being misdetected as the adjacent vehicle V2.

Due to low ambient luminance prevailing under conditions of darkness, in the event that mud or other foreign matter has become deposited on the lens, there were instances in which a silhouette of the foreign matter deposited on the lens stood out due to illumination from streetlights or the headlights of a following vehicle traveling in the lane traveled by the host vehicle, and due to capture of a distinct image of the foreign matter deposited on the lens, the image of the foreign matter deposited on the lens was misdetected as being the adjacent vehicle V2. Accordingly, in the present embodiment, in the event that an assessment of darkness has been made, and moreover no light source corresponding to the headlight of the adjacent vehicle V2 is detected, the threshold value modification unit 36 modifies the difference threshold value th for detecting three-dimensional objects, modifying the value to a higher value. Therefore, under conditions in which, under conditions of darkness, it has been assessed that the adjacent vehicle V2 is not present in an adjacent lane, detection of three-dimensional objects can be suppressed, whereby, in the manner discussed previously, situations in which mud or other foreign matter has become deposited on the lens, and the foreign matter deposited on the lens is misdetected as the adjacent vehicle V2, can be effectively prevented. Only in cases in which no light source corresponding to the headlight of the adjacent vehicle V2 is detected, and it can be assessed that the adjacent vehicle V2 is not present in an adjacent lane, does the threshold value modification unit 36 modify to a higher value the difference threshold value th for detecting three-dimensional objects. For this reason, in the present embodiment, in the event that a light source corresponding to a headlight of the adjacent vehicle V2 has been detected, and it has been assessed that the adjacent vehicle V2 is present in an adjacent lane, the difference threshold value th is not modified to a high value, and the presence of the adjacent vehicle V2 in the adjacent lane can be appropriately detected.

Additionally, the threshold value modification unit 36 compares the traveling speed of a three-dimensional object as calculated by the three-dimensional object detection unit 33 to the traveling speed of the host vehicle V1, and in the event that the traveling speed of the three-dimensional object is equal to or less than the traveling speed of the host vehicle V1, or in the event that the difference between the traveling speed of the three-dimensional object and the traveling speed of the host vehicle V1 is less than a predetermined value $\Delta V$, modifies the difference threshold value th. In the event that mud or other foreign matter firmly adheres to the lens and does not move over the lens surface, images of the foreign matter will be captured at identical locations in captured images, and therefore when the traveling speed of three-dimensional objects is calculated based on a differential waveform, the traveling speed of the foreign matter will be calculated as being at the same speed as the traveling speed of the host vehicle. For this reason, in the event that the traveling speed of the three-dimensional object is equal to or less than the traveling speed of the host vehicle V1, or in the event that the difference between the traveling speed of the three-dimensional object and the traveling speed of the host vehicle is less than the predetermined value $\Delta V$, the difference threshold value th is modified to a high value, suppressing detection of three-dimensional objects, whereby detection of foreign matter calculated as having the traveling speed of the host vehicle V1 can be effectively suppressed. The aforedescribed predetermined value $\Delta V$ is a value selected with regard to error in calculation of the traveling speed of foreign matter deposited on the lens, and may be established, as appropriate, through experimentation or the like. By also suppressing detection of three-dimensional objects when the difference relative to the traveling speed of the host vehicle V1 is less than the predetermined value $\Delta V$ in this manner, even in cases of error occurring in calculation of the traveling speed of foreign matter deposited on the lens, detection of foreign matter deposited on the lens can be suppressed.

Further, in the present embodiment, because the threshold value modification unit 36 modifies the difference threshold value th to a higher value in instances in which the traveling speed of a three-dimensional object is equal to or less than the traveling speed of the host vehicle V1, detection of three-dimensional objects which do not approach the host vehicle V1 (three-dimensional objects having slower traveling speed than the host vehicle V1) can be suppressed as well. Specifically, in the present embodiment, the emphasis is on detecting the adjacent vehicle V2 when there is a possibility of contact therewith should the host vehicle V1 change lanes, and thus a three-dimensional object approaching the host vehicle V1 (a three-dimensional object having higher traveling speed than the host vehicle V1) will be detected as the adjacent vehicle V2 approaching the host vehicle V1. For this reason, when the adjacent vehicle V2 is present in an adjacent lane but is not approaching the host vehicle V1 (the adjacent vehicle V2 has a lower traveling speed than the host vehicle V1), the likelihood of contact should the host vehicle V1 change lanes is small, and therefore the difference threshold value th can be modified to a high value, suppressing detection of the adjacent vehicle V2 not approaching the host vehicle V1. In so doing, in the event that, e.g., the driver is alerted to the presence of the adjacent vehicle V2 when the adjacent vehicle V2 is detected, an alert will be issued only when the adjacent vehicle V2 is approaching the host vehicle V1, reducing stress to the driver caused by such alerts.

In the present embodiment, when comparing the traveling speed of the host vehicle V1 and the traveling speed of a three-dimensional object and modifying the difference threshold value th, the threshold value modification unit 36 compares the absolute traveling speed of the host vehicle V1 and the absolute traveling speed of the three-dimensional object; however, such an arrangement is not provided by way of limitation. The threshold value modification unit 36 could, for example, modify the difference threshold value th based on the relative traveling speed of the three-dimensional object with respect to the host vehicle V1. Specifically, in this case, in the event that the relative traveling speed of the three-dimensional object with respect to the host vehicle V1 is a negative value, the threshold value modification unit 36 could assess that the traveling speed of the three-dimensional object is equal to or less than the traveling speed of the host vehicle V1; or in the event that the absolute value of relative traveling speed of the three-dimensional object with respect to the host vehicle V1 is less than the predetermined value ΔV, could decide that the difference between the traveling speed of the three-dimensional object and the traveling speed of the host vehicle V1 is less than the predetermined value ΔV.

Figure 12:
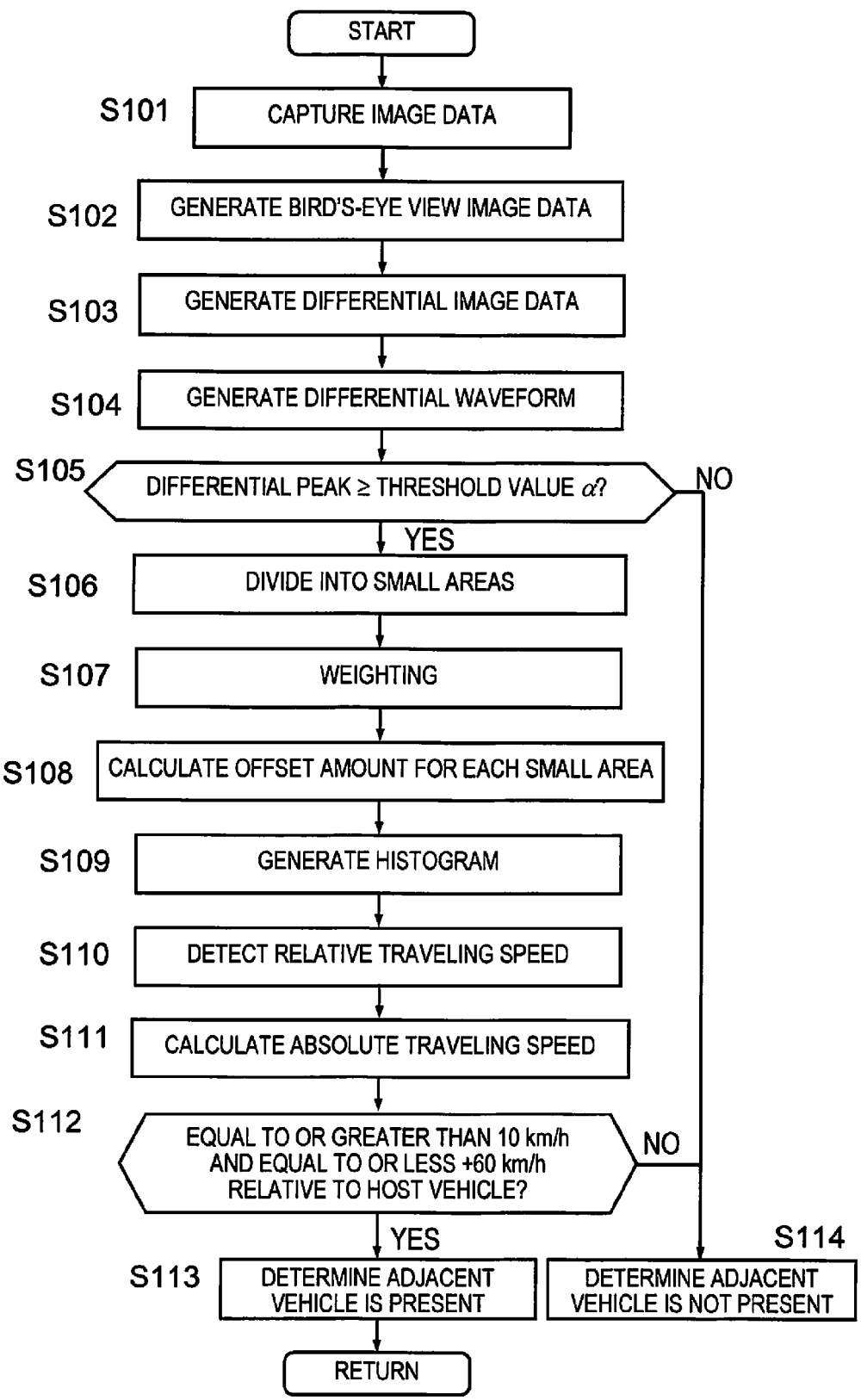
FIG. 12 is a flowchart illustrating an adjacent vehicle detection process according to the first embodiment.

Described next is the process for detecting an adjacent vehicle in accordance with the present embodiment. FIG. 12 is a flowchart illustrating a process for detecting an adjacent vehicle according to the first embodiment. First, data of a captured image P from the camera 10 is acquired by the computer 30 (step S101), and bird's-eye view image $PB_t$ data is generated (step S102) by the viewpoint conversion unit 31, based on the data of the captured image P thus acquired as illustrated in FIG. 12.

Next, the alignment unit 32 aligns the bird's-eye view image $PB_t$ data and the bird's-eye view image $PB_{t-1}$ data from the immediately preceding point in time, and generates differential image $PD_t$ data (step S103). In specific terms, the alignment unit 32 converts differences in pixel values of the bird's-eye view images $PB_t$, $PB_{t-1}$ into absolute values, and when an absolute value in question is equal to or greater than the predetermined difference threshold value th, sets the pixel value of the differential image $PD_t$ to "1," or when the absolute value is less than the predetermined difference threshold value th, sets the pixel value of the differential image $PD_1$ to "0." The difference threshold value th for calculating the pixel values of the differential image $PD_t$ is in some instances modified in a threshold modification process, discussed below, and in cases in which the difference threshold value th has been modified, the modified difference threshold value th will be used in step S103. Thereafter, the three-dimensional object detection unit 33 counts the number of difference pixels DP having pixel values of "1" from the differential image $PD_t$ data, and generates a differential waveform $DW_t$ (step S104).

The three-dimensional object detection unit 33 then assesses whether a peak of the differential waveform $DW_t$ is equal to or greater than a predetermined threshold value α (step S105). In the event that the peak of the differential waveform $DW_t$ is not equal to or greater than the threshold value α, i.e., when there is substantially no difference, no three-dimensional object is considered to be present within the captured image. Accordingly, in the event of an assessment that the peak of the differential waveform $DW_t$ is not equal to or greater than the threshold value α (step S105=No), the three-dimensional object detection unit 33 will assess that no three-dimensional object is present, and that the adjacent vehicle V2 is not present (step S114), then returns to step S101 and repeats the process illustrated in FIG. 12.

On the other hand, in the event of an assessment that the peak of the differential waveform $DW_t$ is equal to or greater than the threshold value α (step S105=Yes), the three-dimensional object detection unit 33 assesses that a three-dimensional object is present in an adjacent lane, and proceeds to step S106, in which the three-dimensional object detection unit 33 divides the differential waveform $DW_t$ into a plurality of small areas $DW_{t1}$ to $DW_{tn}$. Next, the three-dimensional object detection unit 33 performs weighting of each of the small areas $DW_{t1}$ to $DW_{tn}$ (step S107), calculates an offset amount for each of the small areas $DW_{t1}$ to $DW_{tn}$ (step S108), and generates a weighted histogram (step S109).

Based on the histogram, the three-dimensional object detection unit 33 then calculates a relative travel distance representing the travel distance of the three-dimensional object with respect to the host vehicle V1 (step S110). Next, the three-dimensional object detection unit 33 calculates the absolute traveling speed of the three-dimensional object from the relative travel distance (step 111). At this time, the three-dimensional object detection unit 33 performs temporal differentiation of the relative travel distance and calculates the relative traveling speed, as well as adding the host vehicle speed detected by the vehicle speed sensor 20, and calculating the absolute traveling speed.

Thereafter, the three-dimensional object detection unit 33 assesses whether the absolute traveling speed of the three-dimensional object is 10 km/h or more, and additionally whether the relative traveling speed of the three-dimensional object in relation to the host vehicle V1 is +60 km/h or less (step S112). When both conditions are satisfied (step S112=Yes), the three-dimensional object detection unit 33 assesses that the detected three-dimensional object is the adjacent vehicle V2 present in the adjacent lane, and that the adjacent vehicle V2 is present in the adjacent lane (step S113). The process illustrated in FIG. 12 then terminates. On the other hand, in the event that either of the conditions is not satisfied (step S112=No), the three-dimensional object detection unit 33 assesses that the adjacent vehicle V2 is not present in an adjacent lane (step S114). The routine then returns to step S101, and the process illustrated in FIG. 12 is repeated.

In the present embodiment, the left and right rear of the host vehicle V1 are designated as the detection areas A1, A2, and emphasis is placed upon whether there is a possibility of contact should the host vehicle V1 change lanes. For this reason, the process of step S112 is executed. Specifically, on the assumption in the present embodiment that the system is to be operated on a freeway, in the event that the speed of the adjacent vehicle V2 is less than 10 km/h, notwithstanding the presence of the adjacent vehicle V2, there is little problem, because the vehicle would be situated far rearward of the host vehicle V1 during a lane change. Likewise, in the event that the relative speed of the adjacent vehicle V2 with respect to the host vehicle V1 exceeds +60 km/h (i.e., in the event that the adjacent vehicle V2 is moving at a speed greater than 60 km/h above the speed of the host vehicle V1), there is little problem, because the vehicle would be moving ahead of the host vehicle V1 during a lane change. For this reason, step S112 may be said to assess whether or not the adjacent vehicle V2 would pose a problem during a lane change.

In step S112, the assessment as to whether the absolute traveling speed of the adjacent vehicle V2 is 10 km/h or greater, and as to whether the relative traveling speed of the adjacent vehicle V2 in relation to the host vehicle V1 is +60 km/h or less, has the following effect. For example, it could occur that, due to attachment error of the camera 10, the absolute traveling speed of a stationary object is detected as being several kilometers per hour. Accordingly, by assessing whether the speed is 10 km/h or greater, it is possible to reduce the likelihood that the stationary object will be determined to be the adjacent vehicle V2. Also, it could occur that, due to noise, the relative speed of the adjacent vehicle V2 with respect to the host vehicle V1 will be detected to be in excess of +60 km/h. Accordingly, by assessing whether the relative speed is +60 km/h or less, it is possible to reduce the likelihood of errant detection due to noise.

Further, in place of the process of step S112, it may be assessed that the absolute traveling speed of the adjacent vehicle V2 is not negative, or not zero. In the present embodiment, due to the emphasis on whether there is a possibility of contact should the host vehicle V1 change lanes, in the event that the adjacent vehicle V2 is detected in step S112, a warning sound could be issued to the driver of the host vehicle, or a display corresponding to a warning could be produced by a predetermined display device.

Figure 13:
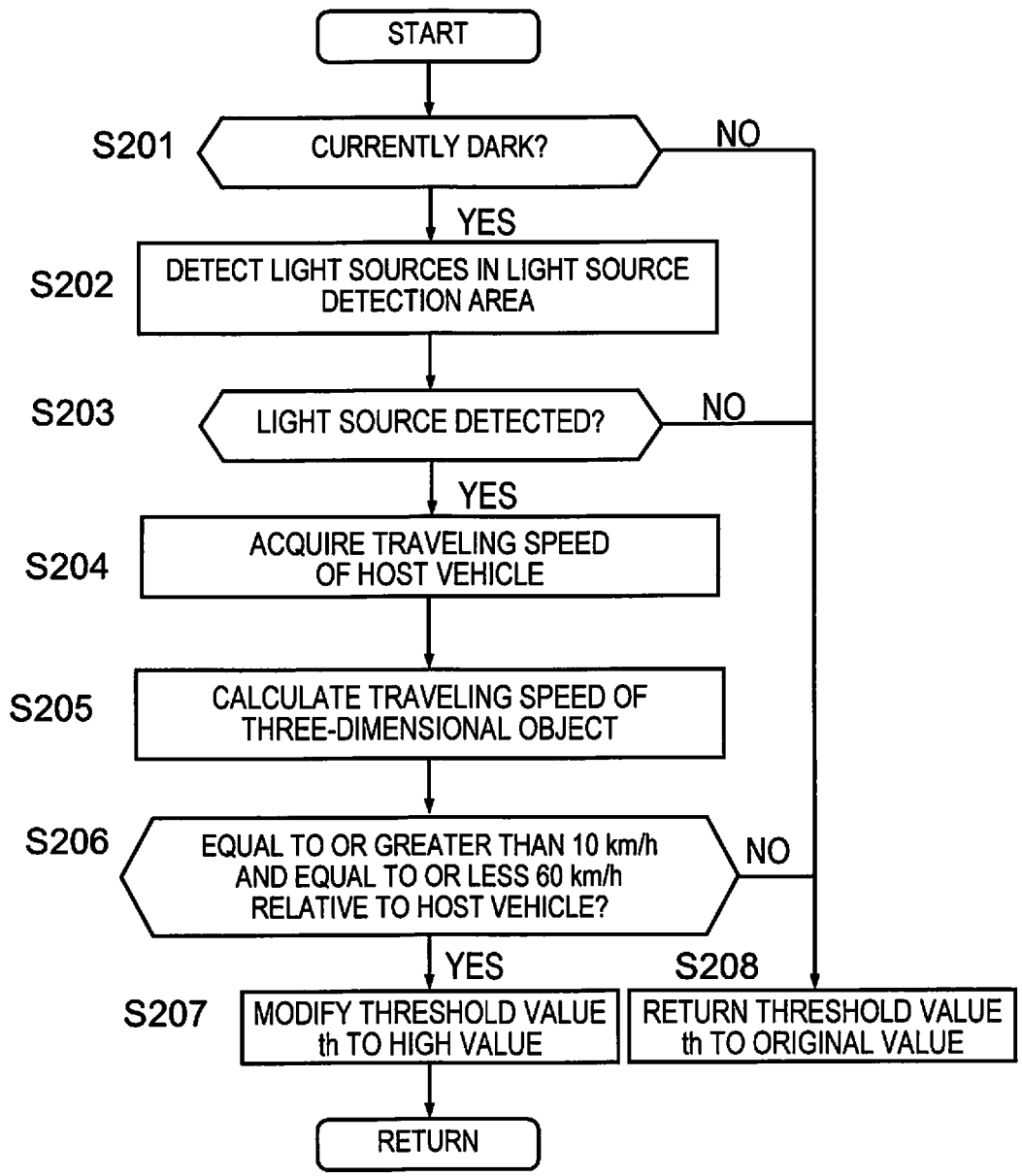
FIG. 13 is a flowchart illustrating a threshold value modification process according to the first embodiment.

Next, a threshold modification process according to the first embodiment will be described with reference to FIG. 13. FIG. 13 is a flowchart illustrating the threshold value modification process according to the first embodiment. The threshold modification process described below is carried out in parallel with the adjacent vehicle detection process illustrated in FIG. 12, and the difference threshold value th which is set through this threshold modification process is applied as the difference threshold value th in the adjacent vehicle detection process illustrated in FIG. 12.

As illustrated in FIG. 13, first, in step S201, an assessment as to whether it is currently dark is made by the darkness assessment unit 34. Specifically, the darkness assessment unit 34 calculates the average luminance of an entire captured image, and detects, as a light source, a high-luminance area having a luminance difference relative to the surroundings that is equal to or greater than a predetermined value, and having predetermined planar dimensions or greater. Then, in the event that in the event that the darkness assessment unit 34 has detected that the average luminance of the entire captured image is equal to or less than a predetermined value, and additionally has detected a predetermined quantity (predetermined number) or more of light sources within a predetermined time, makes an assessment of darkness. In the event of an assessment of darkness, the routine advances to step S202, or in the event of an assessment of non-darkness, advances to step S208.

In step S202, the light source detection unit 35 carries out detection of a light source corresponding to a headlight of the adjacent vehicle V2 is carried out within the light source detection area illustrated in FIG. 11, by. Specifically, the light source detection unit 35 detects, by way of a potential area that corresponds to the headlight of the adjacent vehicle V2, an image area within the light source detection area illustrated in FIG. 11, which image area differs in brightness from the surroundings by a predetermined value or more, and which has a size equal to greater than predetermined planar dimensions, to thereby detect a light source corresponding to the headlight of the adjacent vehicle V2. In particular, in the present embodiment, the light source detection unit 35 repeatedly carries out detection of light sources corresponding to headlights of the adjacent vehicle V2, and in the event that a light source corresponding to a headlight of the adjacent vehicle V2 has been detected even once within a predetermined time, outputs a detection result to the effect that a light source corresponding to the headlight of the adjacent vehicle V2 was detected; or in the event that no light source was detected within the light source detection area within the predetermined time, issues an output to the effect that no light source corresponding to the headlight of the adjacent vehicle V2 was detected. In so doing, it can be appropriately assessed whether a light source corresponding to a headlight of the adjacent vehicle V2 is present. Then, in step S203, using the results of detection in step S202, an assessment is made by the threshold value modification unit 36 as to whether a light source corresponding to a headlight of the adjacent vehicle V2 was detected within the light source detection area, and in the event that that no light source corresponding to a headlight of the adjacent vehicle V2 was detected, the routine advances to step S204, whereas in the event that a light source corresponding to a headlight of the adjacent vehicle V2 was detected, the routine advances to step S208.

In step S204, the traveling speed of the host vehicle V1 is acquired by the threshold value modification unit 36. For example, the threshold value modification unit 36 acquires the traveling speed of the host vehicle V1 from the vehicle speed sensor 20. In step S205, the threshold value modification unit 36 acquires the traveling speed of a three-dimensional object. For example, from the three-dimensional object detection unit 33, the threshold value modification unit 36 acquires the traveling speed of the three-dimensional object, as calculated through the adjacent vehicle detection process illustrated in FIG. 12.

Then, in step S206, the threshold value modification unit 36 carries out a comparison of the traveling speed of the host vehicle V1 that was acquired in step S204, and the traveling speed of the three-dimensional object that was acquired in step S205. In specific terms, the threshold value modification unit 36 compares the traveling speed of the host vehicle V1 and the traveling speed of the three-dimensional object, and assesses whether the traveling speed of the three-dimensional object is equal to or less than the traveling speed of the host vehicle V1, or whether the difference between the traveling speed of the three-dimensional object and the traveling speed of the host vehicle is less than the predetermined value $\Delta V$. In the event that either condition is met, the assessment is made that the three-dimensional object detected by the three-dimensional object detection unit 33 is not the adjacent vehicle V2 approaching the host vehicle V1, the routine advances to step S207, and the value of the difference threshold value th is modified to a high value by the threshold value modification unit 36. In so doing, in the event that, under conditions of darkness, the adjacent vehicle V2 approaching the host vehicle V1 is not present, detection of three-dimensional objects is suppressed during the adjacent vehicle detection process illustrated in FIG. 12, whereby even when mud or other foreign matter has been deposited on the lens, detection of such foreign matter is suppressed, and as a result, errant detection of foreign matter deposited on the lens as being the adjacent vehicle V2 can be effectively prevented. On the other hand, when neither condition is met, an assessment is made that a three-dimensional object detected by the three-dimensional object detection unit 33 is the adjacent vehicle V2 approaching the host vehicle V1, the routine advances to step S208, and, in the event that the value of the difference threshold value th has been modified to a high value, the difference threshold value th is returned to its original value. In so doing, during the adjacent vehicle detection process illustrated in FIG. 12, the original value of the difference threshold value th is employed when carrying out detection of the adjacent vehicle V2 approaching the host vehicle V1, and as a result, the adjacent vehicle V2 approaching the host vehicle V1 can be detected in an appropriate manner.

In the event that an assessment of non-darkness was not made in step S201, due to the possibility that the luminance of the surroundings is bright, it is considered unlikely that a silhouette of foreign matter deposited on the lens would stand out due to illumination from streetlights, illumination from headlights of a following vehicle traveling in the lane traveled by the host vehicle V1, or the like, and that an image of the foreign matter deposited on the lens would be misdetected as being the adjacent vehicle V2. Therefore, in this case, the routine advances to step S208 without modifying the difference threshold value th. In the event that a light source corresponding to a headlight of the adjacent vehicle V2 has been detected in step S203, it will be assessed that the adjacent vehicle V2 is present in an adjacent lane, and therefore the routine advances to step S208, and the value of the difference threshold value th is returned to its original value, in order to appropriately detect the adjacent vehicle V2.

In the above manner, according to the first embodiment, in the event that the darkness assessment unit 34 makes an assessment of darkness, and moreover no light source corresponding to a headlight of the adjacent vehicle V2 is detected by the light source detection unit 35, the traveling speed of a three-dimensional object and the traveling speed of the host vehicle V1 are compared, and in the event that the traveling speed of the three-dimensional object is equal to or less than the traveling speed of the host vehicle V1, or the difference between the traveling speed of a three-dimensional object and the traveling speed of the host vehicle is less than a predetermined value, the difference threshold value th is modified to a high value, so as to suppress detection of three-dimensional objects. In so doing, in the event that, under conditions of darkness, it can be assessed that the adjacent vehicle V2 is not present in an adjacent lane, the difference threshold value th is modified to a high value in order to suppress detection of three-dimensional objects, whereby a situation in which, due to the low luminance of the surroundings under conditions of darkness, a silhouette of foreign matter deposited on the lens stands out due to illumination from streetlights, to illumination from headlights of a following vehicle traveling in the lane traveled by the host vehicle, or the like, and an image of the foreign matter is misdetected as being the adjacent vehicle V2, can be effectively prevented.

Moreover, when mud or other foreign matter firmly adheres to the lens and the foreign matter does not move over the lens surface, images of the foreign matter will be captured at identical locations in captured images, and therefore when the traveling speed of three-dimensional objects is calculated on the basis of a differential waveform, the traveling speed of the foreign matter deposited on the lens will be calculated as being about the same speed as the traveling speed of the host vehicle V1. For this reason, in the event that, as a result of a comparison of the traveling speed of the three-dimensional object and the traveling speed of the host vehicle V1, it is found that the traveling speed of the three-dimensional object is equal to or less than the traveling speed of the host vehicle V1, or that the difference between the traveling speed of the three-dimensional object and the traveling speed of the host vehicle is less than a predetermined value, the difference threshold value th is modified to a high value, whereby detection of foreign matter having about the same the traveling speed as the traveling speed of the host vehicle V1 can be suppressed. On the other hand, because the traveling speed of the adjacent vehicle V2 approaching the host vehicle V1 is higher than the traveling speed of the host vehicle V1, in the event that the traveling speed of a three-dimensional object is higher than the traveling speed of the host vehicle V1, by leaving the difference threshold value th unmodified and using this original difference threshold value th when detecting the three-dimensional object, the adjacent vehicle V2 approaching the host vehicle V1 can be detected in an appropriate manner.

Embodiment 2

Figure 14:
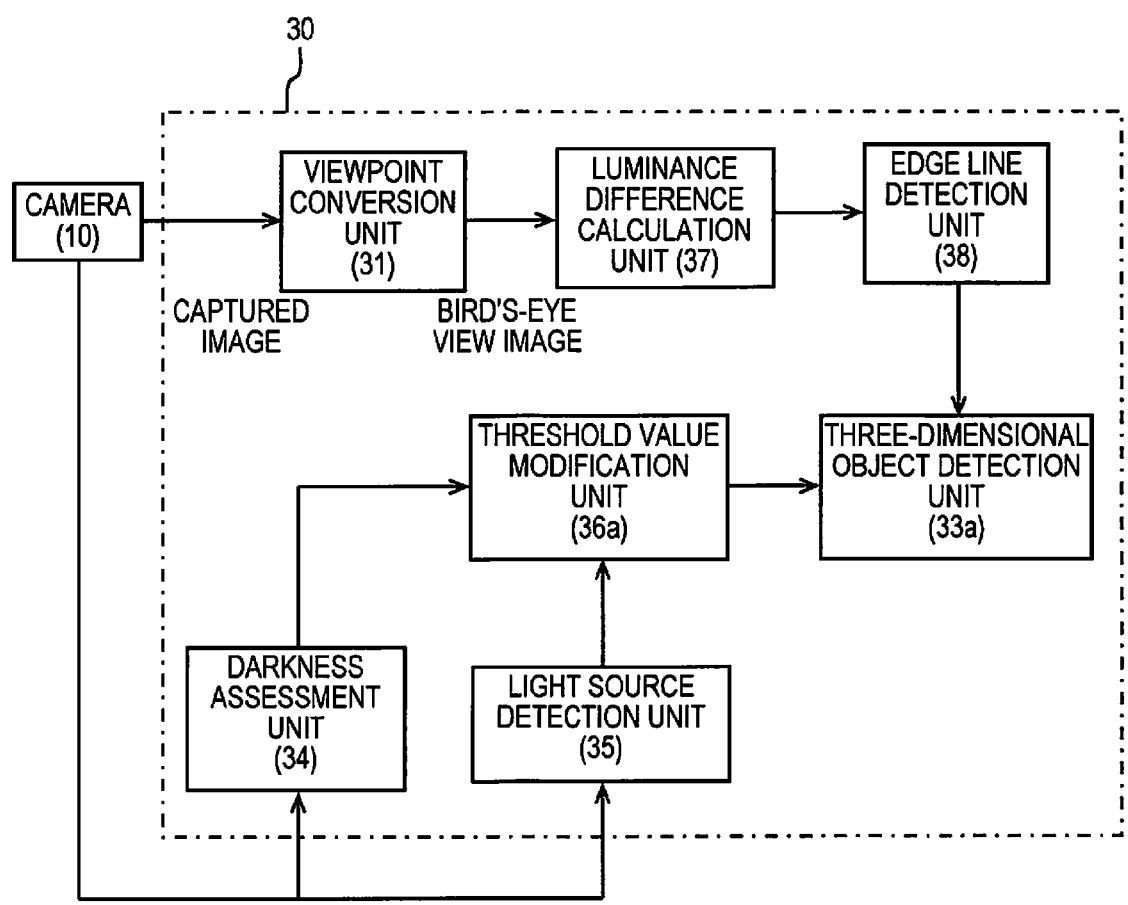
FIG. 14 is a block diagram of the details of a computer according to a second embodiment.

The description turns next to a three-dimensional object detection device 1a according to a second embodiment. The three-dimensional object detection device 1a according to the second embodiment is similar to the first embodiment, except that, as illustrated in FIG. 14, a computer 30a is provided in place of the computer 30 of the first embodiment, and the operation is as described below. Here, FIG. 14 is a block view illustrating the details of the computer 30a according to the second embodiment.

The three-dimensional object detection device 1a according to the second embodiment is provided with a camera 10 and a computer 30a, as illustrated in FIG. 14. The computer 30a is constituted by a viewpoint conversion unit 31, a luminance difference calculation unit 37, an edge line detection unit 38, a three-dimensional object detection unit 33a, a darkness assessment unit 34, a light source detection unit 35, and a threshold value modification unit 36a. The constituent parts of the three-dimensional object detection device 1a according to the second embodiment are described below. The viewpoint conversion unit 31, the darkness assessment unit 34, and the light source detection unit 35 are similar in constitution to those in the first embodiment, and therefore are not described.

Figure 15:
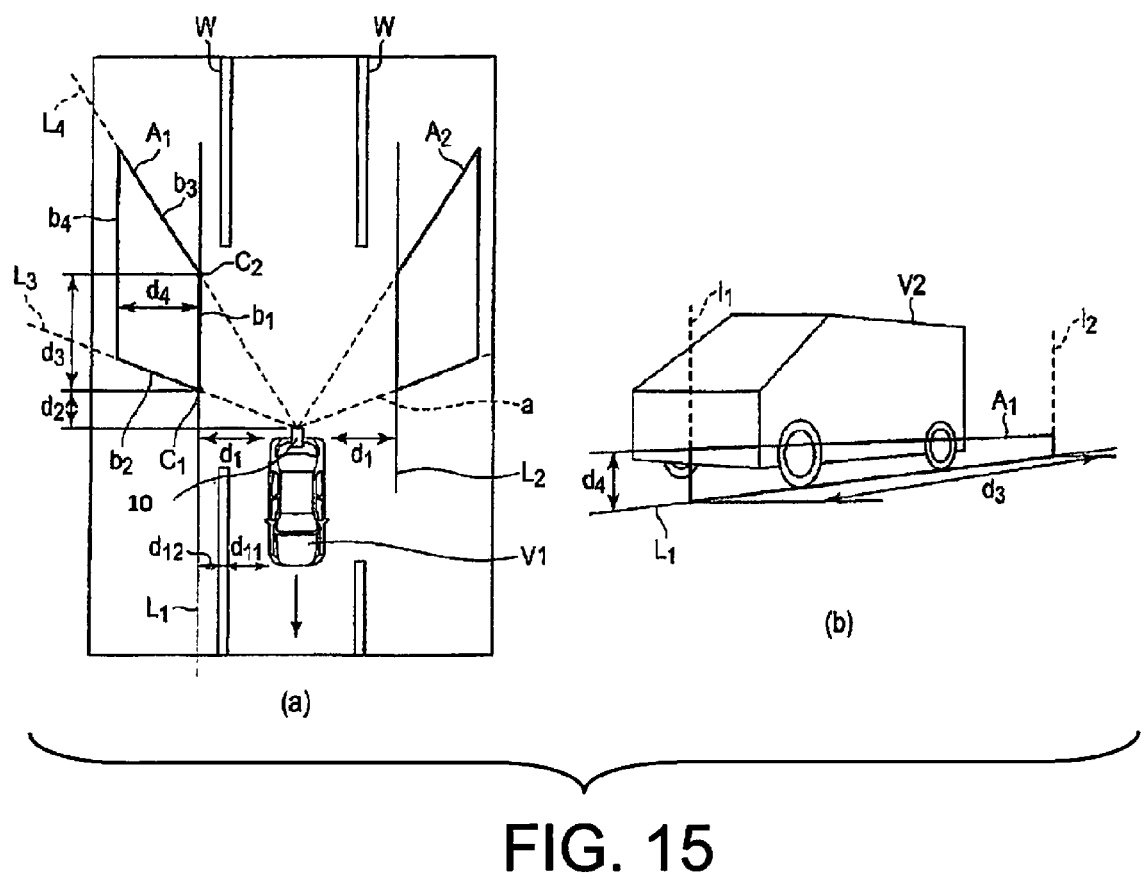
FIG. 15 is a view of the traveling state of a vehicle, with part (a) being a plan view of positional relationships of detection areas, and part (b) being a perspective view of positional relationships of detection areas in real space.

FIG. 15 is a view of the imaging range of the camera 10 in FIG. 14. Part (a) of FIG. 15 is a plan view, and part (b) of FIG. 15 illustrates a perspective view in real space rearward from the host vehicle V1. The camera 10 is set to a predetermined view angle a, and captures the rearward side of the host vehicle V1 included in the predetermined view angle a, as illustrated in part (a) of FIG. 15. The view angle a of the camera 10 is set such that, in addition to the lane in which the host vehicle V1 is traveling, adjacent lanes are included in the imaging range of the camera 10, in the same manner as illustrated in FIG. 2.

The detection areas A1, A2 in the present example are trapezoidal in plan view (bird's-eye view state), and the position, size, and shape of these detection areas A1, A2 are assessed based on distances $d_1$ to $d_4$. The detection areas A1, A2 of the example illustrated in the drawing are not limited to being trapezoidal, and may also be rectangular or some other shape in a bird's-eye view state, as illustrated in FIG. 2.

Here, the distance d1 is the distance from the host vehicle V1 to a ground contact line L1, L2. The ground contact lines L1, L2 refer to lines at which a three-dimensional object present in a lane adjacent to the lane traveled by the host vehicle V1 contacts the surface of the ground. An object of the present embodiment is to detect an adjacent vehicle V2 or the like (including two-wheeled vehicles or the like) traveling behind the host vehicle V1, in a lane adjacently to the left or right of the lane of the host vehicle V1. Accordingly, the distance d1, which represents the position of the ground contact lines L1, L2 of the adjacent vehicle V2, can be selected in a generally fixed manner, from the distance d11 from the host vehicle V1 to a white lane stripe W, and the distance d12 from the white lane stripe W to the position at which the adjacent vehicle V2 is predicted to travel.

There is no limitation to selecting the distance d1 in a fixed manner; the distance may be variable. In this case, the computer 30a may use white lane stripe recognition or another technique to recognize the positions of the white lane stripes W in relation to the host vehicle V1, and select the distance d11 based on the positions of the recognized white lane stripes W. The distance d1 is thereby set in variable fashion, using the selected distance d11. In the present embodiment described below, the position of travel of the adjacent vehicle V2 (the distance d12 from the white lane stripe W) and the position of travel of the host vehicle V1 (the distance d11 from the white lane stripe W) are mostly predictable, and the distance d1 is selected in a fixed manner.

A distance d2 represents a distance extending in the direction of vehicle advance from the rear end part of the host vehicle V1. This distance d2 is selected in such a way that the detection areas A1, A2 are accommodated at least within the view angle a of the camera 10. In the present embodiment in particular, the distance d2 is set to be tangential to a range demarcated by the view angle a. The distance d3 represents the length of the detection areas A1, A2 in the direction of vehicle advance. This distance d3 is selected based on the size of the three-dimensional object to be detected. In the present embodiment, the adjacent vehicle V2 or the like is to be detected, and therefore the distance d3 is set to a length that includes the adjacent vehicle V2.

The distance d4 is a distance indicating a height which has been set such that tires of the adjacent vehicle V2 or the like are included in real space, as illustrated in part (b) of FIG. 15. In a bird's-eye view image, the distance d4 is the length illustrated in part (a) of FIG. 15. The distance d4 can also be of a length that does not include lanes further adjacent to the left and right adjacent lanes in the bird's-eye view image (i.e., "next-next lanes" which are situated two lanes away). The reason is as follows: when lanes two lanes away from the lane of the host vehicle V1 are included, it is no longer possible to distinguish whether the adjacent vehicle V2 is present in an adjacent lane to the left or right of the host vehicle lane which is the lane traveled by the host vehicle V1, or whether an adjacent-adjacent vehicle is present in a next-next lane situated two lanes away.

As described above, the distances d1 to d4 are selected, and the position, size, and shape of the detection areas A1, A2 are selected thereby. More specifically, the position of the top side b1 of the trapezoidal detection areas A1, A2 is selected through the distance d1. The start position C1 of the top side b1 is selected through the distance d2. The end position C2 of the top side b1 is selected through the distance d3. The lateral side b2 of the trapezoidal detection areas A1, A2 is selected through a straight line L3 extending from the camera 10 toward the starting position C1. Similarly, the lateral side b3 of the trapezoidal detection areas A1, A2 is selected through a straight line L4 extending from the camera 10 toward the end position C2. The position of the lower side b4 of the trapezoidal detection areas A1, A2 is selected through the distance d4. Thus, areas bounded by the sides b1 to b4 constitute the detection areas A1, A2. The detection areas A1, A2 are regular squares (rectangles) in real space, situated rearward from the host vehicle V1, as illustrated in part (b) of FIG. 15.

The luminance difference calculation unit 37 carries out luminance difference calculations on bird's-eye view image data that has undergone viewpoint conversion by the viewpoint conversion unit 31, and thereby detects the edges of a three-dimensional object included in the bird's-eye view image. For each of a plurality of positions along a perpendicular imaginary line extending along a perpendicular direction in real space, the luminance difference calculation unit 37 calculates the luminance difference between two pixels near each position in question. The luminance difference calculation unit 37 is capable of calculating the luminance differences either by a method involving setting a single perpendicular imaginary line extending in the perpendicular direction in real space, or by a method involving setting two perpendicular imaginary lines.

The specific method for setting two perpendicular imaginary lines will be described here. For bird's-eye view image data that has undergone viewpoint conversion, the luminance difference calculation unit 37 sets a first perpendicular imaginary line that corresponds to a line segment extending in the perpendicular direction in real space, and a second perpendicular imaginary line which is different from the first perpendicular imaginary line and which corresponds to the line segment extending in the perpendicular direction in real space. The luminance difference calculation unit 37 determines luminance differences between points on the first perpendicular imaginary line and points on the second perpendicular imaginary line, doing so in continuous fashion along the first perpendicular imaginary line and the second perpendicular imaginary line. The operation of the luminance difference calculation unit 37 is described in detail below.

Figure 16:
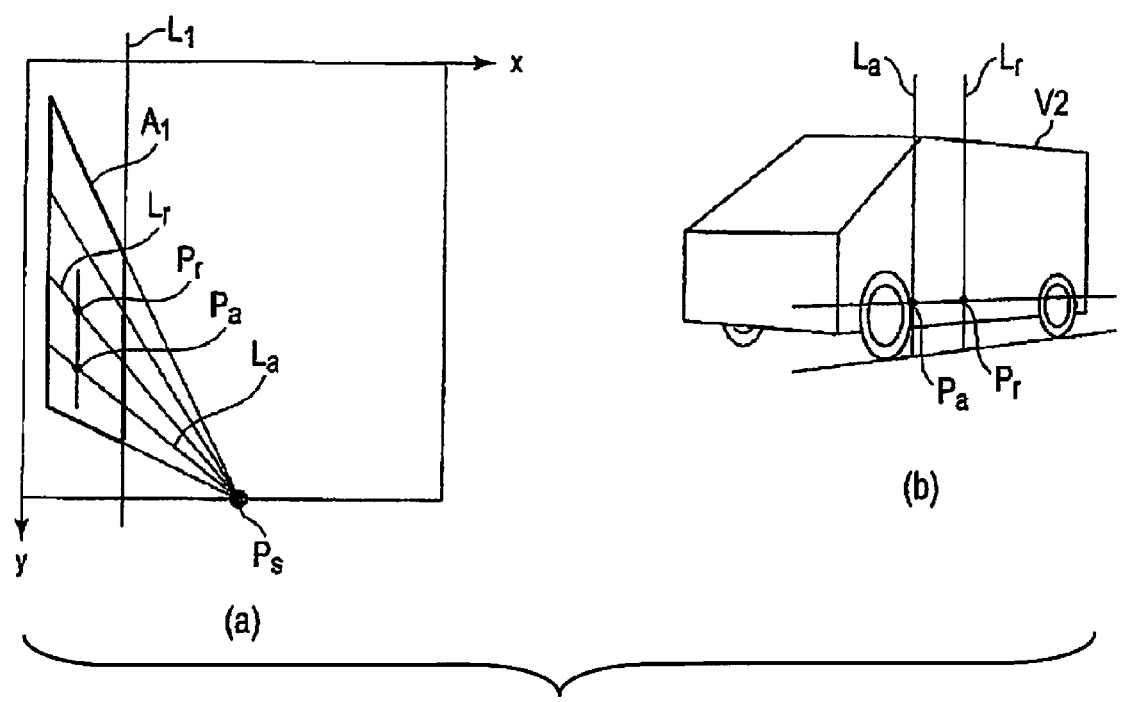
FIG. 16 is a view of the operation of a luminance difference calculation unit according to the second embodiment, with part (a) of FIG. 16 being a view of the position relationship between an attention line, a reference line, an attention point, and a reference point in a bird's-eye view image, and part (b) of FIG. 16 being a view of the positional relationship between the attention line, the reference line, the attention point, and the reference point in real space.

The luminance difference calculation unit 37 sets a first perpendicular imaginary line La (hereinbelow referred to as attention line La) that corresponds to a line segment extending in the perpendicular direction in real space and that passes through the detection area A1, as illustrated in part (a) of FIG. 16. The luminance difference calculation unit 37 also sets a second perpendicular imaginary line Lr (hereinbelow referred to as reference line Lr) that is different from the attention line La, and that corresponds to the line segment extending in the perpendicular direction in real space, and passes through the detection area A1. Here, the reference line Lr is set at a position situated a distance from the attention line La, which distance is equal to a predetermined distance in real space. The lines that correspond to the line segments extending in the perpendicular direction in real space are lines that spread out radially from the position Ps of the camera 10 in a bird's-eye view image. These radially spreading lines are lines that lie along the direction of collapsing of a three-dimensional object when the object is converted to a bird's-eye view.

The luminance difference calculation unit 37 sets an attention point Pa on the attention line La (a point on the first perpendicular imaginary line). The luminance difference calculation unit 37 also sets a reference point Pr on the reference line Lr (a point on the second perpendicular imaginary line). The attention line La, the attention point Pa, the reference line Lr, and the reference point Pr have the relationship in real space illustrated in part (b) of FIG. 16. As will be apparent from part (b) of FIG. 16, the attention line La and the reference line Lr are lines extending in the perpendicular direction in real space, and the attention point Pa and the reference point Pr are points set at generally the same height in real space. It is not necessary for the attention point Pa and the reference point Pr to be exactly at the same height, and a level of error such that the attention point Pa and the reference point Pr may be considered as being at the same height is permissible.

The luminance difference calculation unit 37 determines the luminance difference between the attention point Pa and the reference point Pr. In cases of a large luminance difference between the attention point Pa and the reference point Pr, it is conceivable that an edge could be present between the attention point Pa and the reference point Pr. In the second embodiment in particular, perpendicular imaginary lines are set as line segments extending in the perpendicular direction in real space in relation to the bird's-eye view image, in order to detect three-dimensional objects present in the detection areas A1, A2. Therefore, in cases of a high luminance difference between the attention line La and the reference line Lr, it is highly likely that an edge of a three-dimensional object is present in the location where the attention line La has been set. Accordingly, the edge line detection unit 38 illustrated in FIG. 14 detects an edge line based on the luminance difference between the attention point Pa and the reference point Pr.

Figure 17:
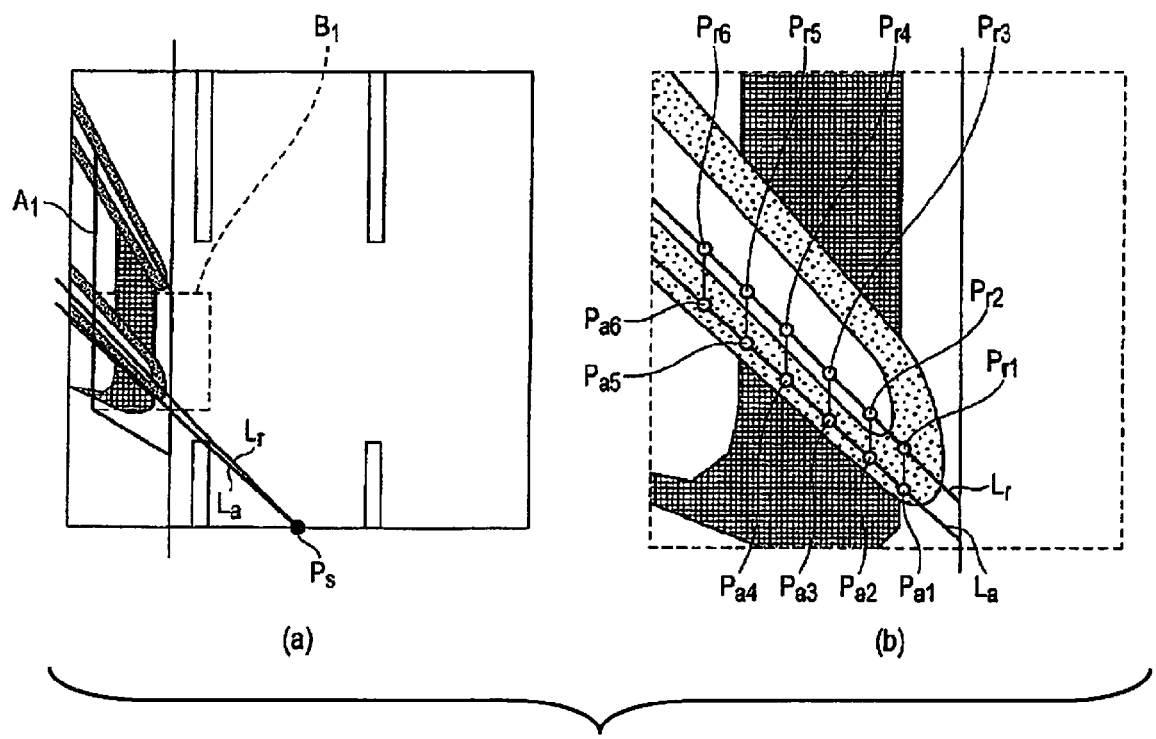
FIG. 17 is a view of detailed operation of the luminance difference calculation unit according to the second embodiment, with part (a) of FIG. 17 being a view of a detection area in the bird's-eye view image, and part (b) of FIG. 17 being a view of the positional relationship between the attention line, the reference line, the attention point, and the reference point in the bird's-eye view image.

This point will be described in greater detail. FIG. 17 is a view of the detailed operation of the luminance difference calculation unit 37. Part (a) of FIG. 17 illustrates a bird's-eye view image of the bird's-eye view state, and part (b) of FIG. 17 is an enlarged view of a portion B1 of the bird's-eye view image illustrated in part (a) of FIG. 17. In FIG. 17, only the detection area A1 is illustrated and described, but the luminance difference is calculated by the same procedure for the detection area A2 as well.

When the adjacent vehicle V2 shows up in a captured image captured by the camera 10, the adjacent vehicle V2 appears in the detection area A1 in the bird's-eye view image as illustrated in part (a) of FIG. 17. Let it be assumed that the attention line La has been set over a rubber portion of a tire of the adjacent vehicle V2 in the bird's-eye view image in part (a) of FIG. 17, as illustrated in the enlarged view of area B1 in part (a) of FIG. 17. In this state, first, the luminance difference calculation unit 37 sets the reference line Lr. The reference line Lr is set along the perpendicular direction, at a position a predetermined distance in real space from the attention line La. Specifically, in the three-dimensional object detection device 1a according to the present embodiment, the reference line Lr is set at a position 10 cm away in real space from the attention line La. The reference line Lr is thereby set over the wheel of the tire of the adjacent vehicle V2, e.g., at a distance equivalent to 10 cm from the rubber of the tire of the adjacent vehicle V2 in the bird's-eye view image.

Next, the luminance difference calculation unit 37 sets a plurality of attention points Pa1 to PaN on the attention line La. In part (b) of FIG. 17, for convenience in description, six attention points Pa1 to Pa6 (hereinbelow referred to simply as attention points Pai when indicating an arbitrary point) are set. An arbitrary number of attention points Pa may be set on the attention line La. In the description below, it is assumed that N attention points Pa have been set on the attention line La.

The luminance difference calculation unit 37 next sets the reference points Pr1 to PrN such that these points are at the same height as the attention points Pa1 to PaN in real space. The luminance difference calculation unit 37 then calculates the luminance differences between attention points Pa and reference points Pr situated at the same height. The luminance difference calculation unit 37 thereby calculates the luminance differences between pairs of pixels, for each of the plurality of positions (1–N) along the perpendicular imaginary line extending in the perpendicular direction in real space. The luminance difference calculation unit 37 calculates the luminance difference between, e.g., a first attention point Pa1 and a first reference point Pr1, and calculates the luminance difference between a second attention point Pa2 and a second reference point Pr2. The luminance difference calculation unit 37 thereby determines luminance differences in continuous fashion along the attention line La and the reference line Lr. In other words, the luminance difference calculation unit 37 sequentially determines the luminance differences between the third to $N^{th}$ attention points Pa3 to PaN and the third to $N^{th}$ reference points Pr3 to PrN.

While shifting the attention line La within the detection area A1, the luminance difference calculation unit 37 repeats the process of setting the above-described reference line Lr, setting the attention point Pa and the reference point Pr, and calculating the luminance difference. In other words, the luminance difference calculation unit 37 repeatedly executes the above-described process while changing the positions of the attention line La and the reference line Lr, respectively, by the same distance in the direction of extension of the ground contact line L1 in real space. The luminance difference calculation unit 37, e.g., sets the line that was the reference line Lr in the previous process as the next attention line La, then sets the reference line Lr in relation to this attention line La, determining luminance differences in successive fashion.

Thus, in the second embodiment, by determining luminance differences from the attention points Pa on the attention line La and the reference points Pr on the reference line Lr situated at generally the same height in real space, luminance differences can be clearly detected in cases in which an edge extending in the perpendicular direction is present. The accuracy of detection of a three-dimensional object can be enhanced without any impact on the process of detecting the three-dimensional object, even when the three-dimensional object has been stretched according to the height from the road surface due to conversion to a bird's-eye view image, in order compare the luminance between perpendicular imaginary lines extending in the perpendicular direction in real space.

Returning to FIG. 14, the edge line detection unit 38 detects an edge line from continuous luminance differences calculated by the luminance difference calculation unit 37. For example, in the case illustrated in part (b) of FIG. 17, the first attention point Pa1 and the first reference point Pr1 are positioned at the same tire portion, and the luminance difference is therefore small. The second to sixth attention points Pa2 to Pa6 are positioned in the rubber portion of the tire, and the second to sixth reference points Pr2 to Pr6 are positioned in the wheel portion of the tire. Therefore, the luminance differences between the second to sixth attention points Pa2 to Pa6 and the second to sixth reference points Pr2 to Pr6 are great. Accordingly, the edge line detection unit 38 can detect that an edge line is present between the second to sixth attention points Pa2 to Pa6 and the second to sixth reference points Pr2 to Pr6, which have large luminance differences.

Specifically, when an edge line is to be detected, the edge line detection unit 38 first assigns an $i^{th}$ attention point Pai an attribute, from the luminance difference between the $i^{th}$ attention point Pai (coordinates (xi, yi)) to the $i^{th}$ reference point Pri (coordinates (xi', yi')) in accordance with formula 1 noted below.

$$\text{When } 1(xi,yi) > 1(xi',yi') + t \; S(xi,yi) = 1$$

$$\text{When } 1(xi,yi) < 1(xi',yi') - t \; S(xi,yi) = -1$$

Otherwise, $$s(xi,yi) = 0 \qquad \text{Formula 1}$$

In formula 1 above, t represents an edge threshold value; 1(xi, yi) represents the luminance value of the $i^{th}$ attention point Pai; and 1(xi', yi') represents the luminance value of the $i^{th}$ reference point Pri. In accordance with the aforementioned formula 1, in a case in which the luminance value of the attention point Pai is greater than a luminance value obtained by adding the threshold value t to the reference point Pri, the attribute s(xi, yi) of the attention point Pai is '1.' On the other hand, in a case in which the luminance value of the attention point Pai is less than a luminance value obtained by subtracting the edge threshold value t from the reference point Pri, the attribute s(xi, yi) of the attention point Pai is '−1'. In a case in which the luminance value of the attention point Pai and the luminance value of the reference point Pri have a relationship other than that noted above, the attribute s(xi, yi) of the attention point Pai is '0.' In the present embodiment, there will be instances in which the edge threshold value t is modified by the threshold value modification unit 36a, discussed later, and in cases in which the edge threshold value t has been modified by the threshold value modification unit 36a, the edge threshold value t which has been modified by the threshold value modification unit 36a is employed when detecting the attribute s(xi, yi) of the attention point Pai.

Next, based on the following formula 2, the edge line detection unit 38 assesses whether the attention line La is an edge line, from the continuity c(xi, yi) of the attribute s along the attention line La.

When $s(xi,yi)=s(xi+1,yi+1)$ (excluding when 0=0)
$c(xi, yi)=1$

Otherwise, $$c(xi,yi)=0 \qquad \text{Formula 2}$$

In cases in which the attribute s(xi, yi) of the attention point Pai and the attribute s(xi+1, yi+1) of an adjacent attention point Pai+1 are the same, the continuity c(xi, yi) is '1.' In cases in which the attribute s(xi, yi) of the attention point Pai and the attribute s(xi+1, yi+1) of the adjacent attention point Pai+1 are not the same, the continuity c(xi, yi) is '0.'

Next, the edge line detection unit 38 determines the sum of the continuity c values of all the attention points Pa on the attention line La. The edge line detection unit 38 divides the sum of the continuity c values thusly determined by the number N of attention points Pa, to thereby normalize the continuity c. In the event that the normalized value has exceeded a threshold value θ, the edge line detection unit 38 assesses that the attention line La is an edge line. The threshold value θ is a value set in advance, by experimentation or other means.

In other words, the edge line detection unit 38 assesses whether the attention line La is an edge line, based on formula 3 noted below. The edge line detection unit 38 then assesses whether all of the attention lines La drawn on the detection area A1 are edge lines.

$$\Sigma c(xi,yi)/N>\theta \qquad \text{Formula 3}$$

Figure 18:
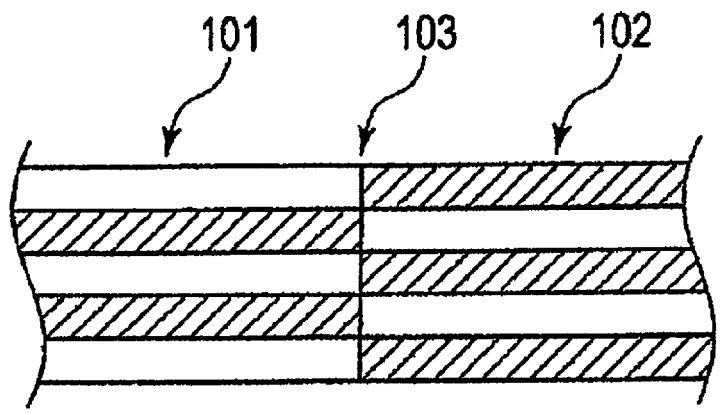
FIG. 18 is a view of an image example describing an edge detection operation.

In this manner, in the second embodiment, an attribute is assigned to the attention point Pa based on the luminance difference between the attention point Pa on the attention line La and the reference point Pr on the reference line Lr, and based on the continuity c of the attribute along the attention line L, it is assessed whether the attention line La in question is an edge line. Therefore, the boundaries between areas of high luminance and areas of low luminance are detected as edge lines, and edges can be detected in a manner consistent with the natural human senses. The results of the above will be described in detail. FIG. 18 is a view of an image example describing processing by the edge line detection unit 38. This image example is an image in which a first stripe pattern 101 indicating a stripe pattern of repeating areas of high luminance and areas of low luminance, and a second stripe pattern 102 indicating a stripe pattern of repeating areas of low luminance and areas of high luminance, are situated adjacent to each other. Also, in this image example, areas of high luminance in the first stripe pattern 101 and areas of low luminance in the second stripe pattern 102 are adjacent to each other, and areas of low luminance in the first stripe pattern 101 and areas of high luminance in the second stripe pattern 102 are adjacent to each other. A region 103 positioned on the boundary between the first stripe pattern 101 and the second stripe pattern 102 would tend not to be perceived as an edge by the human senses.

In contrast to this, because the areas of low luminance and the areas of high luminance are adjacent to each other, when edges are detected solely through luminance differences, the region 103 will be recognized as an edge. However, because the edge line detection unit 38 assesses the region 103 to be an edge line only in cases in which, in addition to the luminance differences in the region 103, there is continuity of the attribute of the luminance differences, the edge line detection unit 38 can suppress errant assessment whereby the region 103 which would not recognized as an edge line by the human senses is recognized as an edge line. Edge detection can thereby take place in a manner consistent with the human senses.

To return to FIG. 14, the three-dimensional object detection unit 33a detects a three-dimensional object based on the quantity of edge lines detected by the edge line detection unit 38. As described above, the three-dimensional object detection device 1a according to the present embodiment detects edge lines extending in the perpendicular direction in real space. Detection of numerous edge lines extending in the perpendicular direction indicates that there is a high probability that a three-dimensional object is present in the detection area A1 or A2. Accordingly, the three-dimensional object detection unit 33a detects a three-dimensional object, based on the quantity of edge lines detected by the edge line detection unit 38. Specifically, the three-dimensional object detection unit 33a assesses whether the quantity of edge lines detected by the edge line detection unit 38 is equal to or greater than a predetermined threshold value β, and in the event that the quantity of edge lines is equal to or greater than the predetermined threshold value β, assesses that edge lines detected by the edge line detection unit 38 are the edge lines of a three-dimensional object.

Furthermore, prior to detecting the three-dimensional object, the three-dimensional object detection unit 33a assesses whether the edge lines detected by the edge line detection unit 38 are correct. The three-dimensional object detection unit 33a assesses whether change in luminance at an edge line in a bird's-eye view image of the edge line is equal to or greater than a predetermined threshold value tb. In the event that the change in luminance at the edge line in the bird's-eye view image is equal to or greater than the predetermined threshold value tb, it is assessed that the edge line has been detected due to an errant assessment. On the other hand, when the change in luminance at the edge line in the bird's-eye view image is less than a predetermined threshold value tb, it is assessed that the edge line in question is correct. The threshold value tb is set in advance through experimentation or the like.

Figure 19:
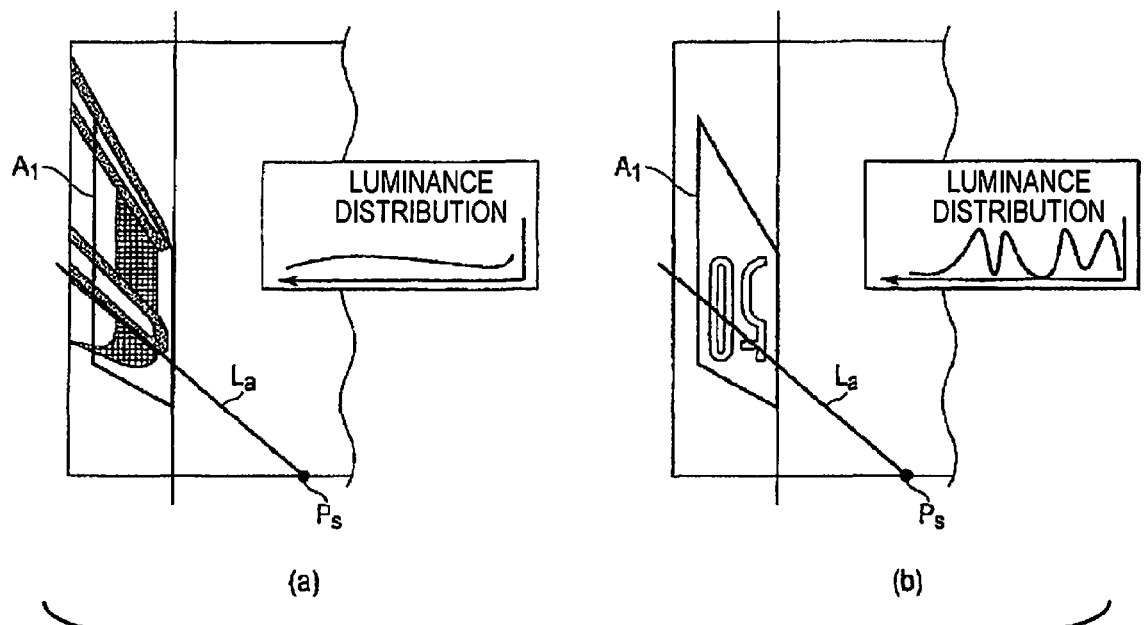
FIG. 19 is a view of an edge line and a luminance distribution on the edge line, with part (a) of FIG. 19 being a view of the luminance distribution when a three-dimensional object (adjacent vehicle) is present in the detection area, and part (b) of FIG. 19 being a view of the luminance distribution when no three-dimensional object is present in the detection area.

FIG. 19 is a view of a luminance distribution on an edge line. Part (a) of FIG. 19 illustrates the edge line and the luminance distribution when an adjacent vehicle V2 as a three-dimensional object is present in the detection area A1, and part (b) of FIG. 19 illustrates the edge line and the luminance distribution when no three-dimensional object is present in the detection area A1.

Let it be assumed that, as illustrated in part (a) of FIG. 19, it has been assessed that the attention line La set on a tire rubber portion of the adjacent vehicle V2 in the bird's-eye view image is an edge line. In this case, the luminance change at the attention line La in the bird's-eye view image is gradual. This is due to the fact that the tire of the adjacent vehicle is stretched within the bird's-eye view image, due to viewpoint conversion of the image captured by the camera 10 to a bird's-eye view image. Let it also be assumed on the other hand that, as illustrated in part (b) of FIG. 19, the attention line La, which has been set in the white character portion "50" painted on the road surface in the bird's-eye view image, has been misassessed as being an edge line. In this case, the luminance change at the attention line La in the bird's-eye view image has considerable undulation. This is because the road surface and other portions of low luminance are present in combination with portions of high luminance in the white characters, at the edge line.

Based on differences in the luminance distribution at the attention line La as described above, the three-dimensional object assessment unit 33a assesses whether an edge line has been detected due to an errant assessment. For example, in cases in which the captured image acquired by the camera 10 is converted to a bird's-eye view image, a three-dimensional object included in the captured image will tend to appear in a stretched state in the bird's-eye view image. As described above, in the event that the tire of the adjacent vehicle V2 is stretched, because the stretching takes place in a single region, i.e., the tire, luminance change of the bird's-eye view image in the direction of stretching tends to be small. In contrast to this, when a character or the like painted on the road surface has been misassessed as being an edge line, areas of high luminance, i.e., the character portion, and areas of low luminance, i.e., the road surface portions, are present in combination in the bird's-eye view image. In such cases, changes in luminance in the direction of stretching tend to be greater. Accordingly, in cases in which the change in luminance along an edge line is equal to or greater than the predetermined threshold value tb, the three-dimensional object detection unit 33a assesses that the edge line in question has been detected due to an errant assessment, and that the edge line in question is not produced by a three-dimensional object. A reduction in accuracy of detection of three-dimensional objects, due to white characters such as "50" on the road surface, or roadside vegetation or the like, being assessed as being edge lines, is minimized thereby. On the other hand, in cases in which the change in luminance along the edge line is less than a predetermined threshold value tb, the three-dimensional object detection unit 33a assesses that the edge line in question is the edge line of a three-dimensional object, and that a three-dimensional object is present.

Specifically, the three-dimensional object detection unit 33a uses either the following formula 4 or 5 when calculating change in luminance of an edge line. The change in luminance of an edge line is equivalent to an evaluation value in the perpendicular direction in real space. Formula 4 evaluates the luminance distribution in terms of the sum of squares of the difference between an $i^{th}$ luminance value $1(xi, yi)$ and an adjacent $i^{th}+1$ luminance value $1(xi+1, yi+1)$, on the attention line La. Formula 5 evaluates the luminance distribution in terms of the sum of the absolute values of the difference between an $i^{th}$ luminance value $1(xi, yi)$ and an adjacent $i^{th}+1$ luminance value $1(xi+1, yi+1)$, on the attention line La.

Evaluation value in perpendicular equivalent
direction=$\Sigma[\{1(xi,yi)-1(xi+1,yi+1)\}^2]$  Formula 4

Evaluation value in perpendicular equivalent
direction=$\Sigma|1(xi,yi)-1(xi+1,yi+1)|$  Formula 5

There is no limitation to using the aforementioned formula 5, and it is also possible to binarize values of an attribute b of an adjacent luminance value using a threshold value t2, and to then sum the binarized values of the attribute b for all of the attention points Pa, as in formula 6 below.

Evaluation value in perpendicular equivalent
direction=$\Sigma b(xi,yi)$ When $|1(xi,yi)-1(xi+1,yi+1)|>t2$, then $b(xi, yi)=1$ Otherwise, $b(xi, yi)=0$  Formula 6

When the absolute value of the luminance difference between the luminance value of the attention point Pai and the luminance value of the reference point Pri is greater than a threshold value t2, the attribute $b(xi, yi)$ of the attention point $Pa(xi, yi)$ in question is '1.' In cases in which the above relationship is not true, the attribute $b(xi, yi)$ of the attention point Pai is '0.' The threshold value t2 is set in advance through experimentation or the like, in order that attention lines La will not be assessed as being on the same three-dimensional object. The three-dimensional object detection unit 33a then sums the attribute b for all of the attention points Pa on the attention line La, and derives an evaluation value in the perpendicular-equivalent direction, to thereby assess whether an edge line is due to a three-dimensional object, and that a three-dimensional object is present.

Further, based on a detected edge line of a three-dimensional object, the three-dimensional object detection unit 33a calculates the traveling speed of the three-dimensional object. While there is no particular limitation as to the method by which the three-dimensional object detection unit 33a calculates the traveling speed of the three-dimensional object, the three-dimensional object detection unit 33a could calculate the traveling speed of the three-dimensional object in the following manner, for example. Specifically, based on an edge line detected from a section corresponding to the detection area A1 or A2, the three-dimensional object detection unit 33a generates a one-dimensional edge waveform $EW_t$. For example, in the same manner as that used to generate the differential waveform $DW_t$ in the first embodiment, the three-dimensional object detection unit 33a counts the number of pixels corresponding to an edge line along the direction of collapsing of the three-dimensional object due to viewpoint conversion, producing a frequency distribution, and thereby generating the one-dimensional edge waveform $ED_t$. Then, based on the edge waveform $EW_t$ at the current point in time and the edge waveform $EW_{t-1}$ at the immediately preceding point in time, the three-dimensional object detection unit 33a calculates the traveling speed of the three-dimensional object. Specifically, from temporal change of the edge waveforms $EW_t$, $EW_{t-1}$, an edge vehicle speed calculation unit 43 calculates the travel distance of the three-dimensional object at a predetermined time, and through temporal differentiation of the calculated travel distance of the three-dimensional object, calculates the traveling speed of the three-dimensional object with respect to the host vehicle V1.

In the event of an assessment of darkness by the darkness assessment unit 34, and in the absence of detection of a light source corresponding to a headlight of the adjacent vehicle V2 by the light source detection unit 35, the threshold value modification unit 36a modifies the edge threshold value t for detecting three-dimensional objects, so as to prevent mud or other foreign matter deposited on the lens from being misdetected as the adjacent vehicle V2. Specifically, in the same manner as in the first embodiment, the threshold value modification unit 36a compares the traveling speed of the three dimensional object calculated by the three-dimensional object detection unit 33 to the traveling speed of the host vehicle V1, and in the event that the traveling speed of the three dimensional object is equal to or less than the traveling speed of the host vehicle V1, or the difference between the traveling speed of the three dimensional object and the traveling speed of the host vehicle is less than a predetermined value, modifies the edge threshold value t to a high value.

Figure 20:
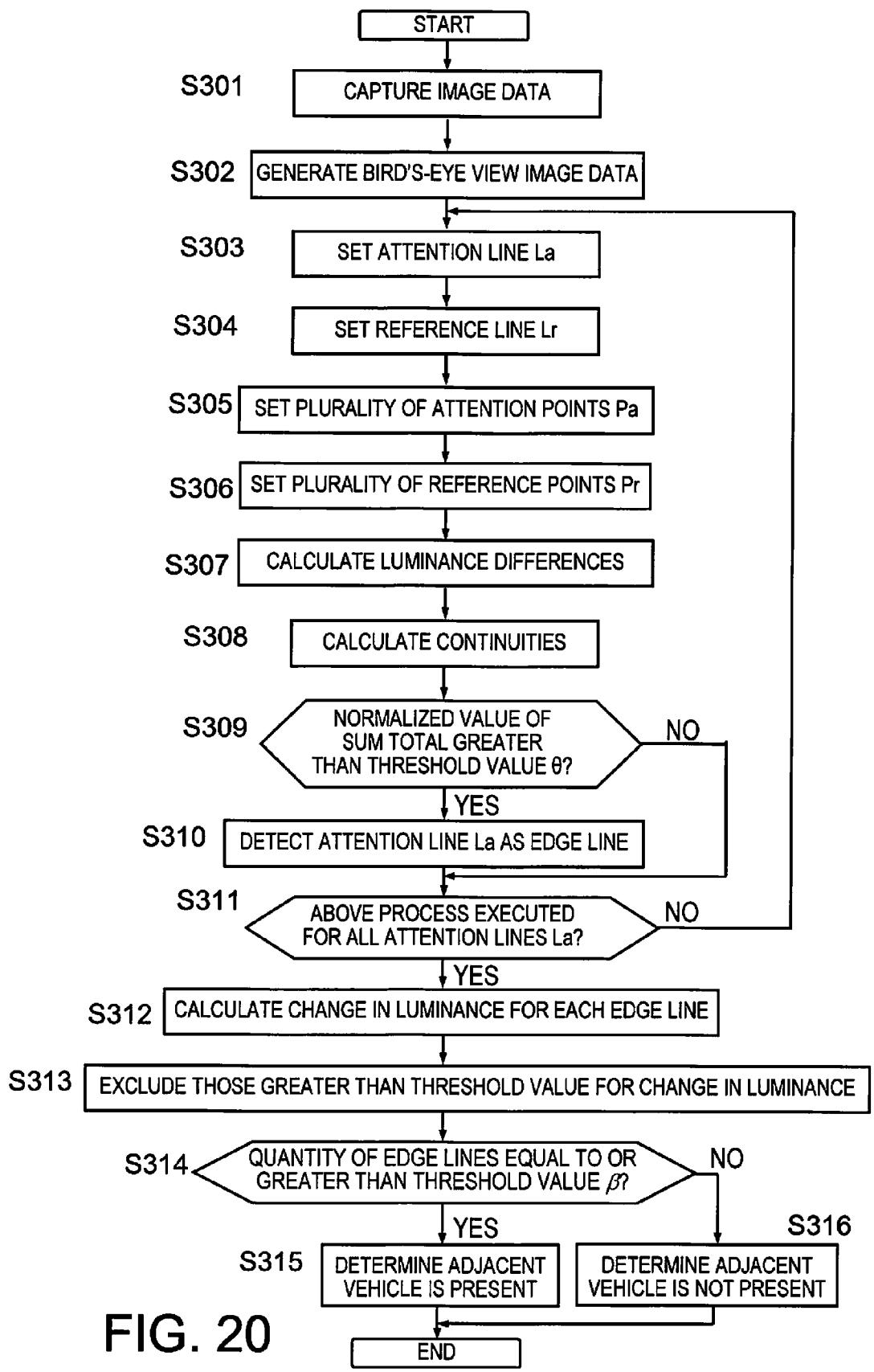
FIG. 20 is a flowchart illustrating an adjacent vehicle detection method according to the second embodiment.

Next, the method for detecting an adjacent vehicle according to the second embodiment will be described with reference to FIG. 20. FIG. 20 is a flowchart illustrating details of the method for detecting an adjacent vehicle according to the second embodiment. This adjacent vehicle detection process is executed in parallel with a degree of turbidity calculation process, discussed below. In FIG. 20, for the sake of convenience, the process is described in relation to the detection area A1, but the same process would be executed in relation to the detection area A2 as well.

In step S301, an image of a predetermined area, specified by the view angle a and the attachment position, is captured by the camera 10, and the image data of the captured image P captured by the camera 10 is acquired by the computer 30a.

Next, in step S302, the viewpoint conversion unit 31 carries out viewpoint conversion on the acquired image data, generating bird's-eye view image data.

Next, in step S303, the luminance difference calculation unit 37 sets the attention line La in the detection area A1. At this time, the luminance difference calculation unit 37 sets a line corresponding to a line extending in the perpendicular direction in real space as the attention line La. Next, in step S304, the luminance difference calculation unit 37 sets the reference line Lr on the detection area A1. At this time, as the reference line Lr, the luminance difference calculation unit 37 sets a line that corresponds to a line segment extending in the perpendicular direction in real space, and separated by a predetermined distance from the attention line La in real space.

Next, in step S305, the luminance difference calculation unit 37 sets a plurality of attention points Pa on the attention line La. In the process, the luminance difference calculation unit 37 sets the attention points Pa in a number such that no problems will occur during edge detection by the edge detection unit 38. Also, in step S306, the luminance difference calculation unit 37 sets reference points Pr such that the attention points Pa and the reference points Pr are at generally the same height in real space. The attention points Pa and the reference points Pr thereby line up in a generally horizontal direction, and edge lines extending in the perpendicular direction in real space are more readily detected.

Next, in step S307, the luminance difference calculation unit 37 calculates the luminance difference between the attention points Pa and the reference points Pr at the same height in real space. Then, based on the luminance difference calculated by the luminance difference calculation unit 37, the edge line detection unit 38 calculates an attribute s of each of the attention points Pa, in accordance with formula 1 described above. In the present embodiment, an edge threshold value t for detecting edges of three-dimensional objects is employed in calculating the attribute s of each of the attention points Pa. In some cases, this edge threshold value t will be modified in a threshold value modification process, discussed below, and in cases in which the edge threshold value t has been modified, the modified edge threshold value is employed in step S307.

Next, in step S308, the edge line detection unit 38 calculates continuity c of the attribute s of each of the attention points Pa, in accordance with formula 2. Then, in step S309, in accordance with the aforementioned formula 3, the edge line detection unit 38 assesses whether a value obtained by normalizing the sum of the continuity c is greater than a threshold value θ. In the event of an assessment that the normalized value is greater than the threshold value θ (step S309=Yes), in step S310, the edge line detection unit 38 detects the attention line La in question to be an edge line. The process then proceeds to step S311. In the event of an assessment that the normalized value is not greater than the threshold value θ (step S309=No), the edge line detection unit 38 does not detect the attention line La in question to be an edge line, and the process proceeds to step S311.

In step S311, the computer 30a assesses whether the process of the aforementioned steps S303 to S310 has been executed for all the attention lines La that it is possible to set on the detection area A1. In the event of an assessment that the aforementioned process has not been carried out for all the attention lines La (step S311=No), the process returns to step S303, a new attention line La is set, and the process through step S311 repeats. On the other hand, in the event of an assessment that the process has been carried out for all the attention lines La (step S311=Yes), the process proceeds to step S312.

In step S312, for each of the edge lines detected in step S310, the three-dimensional object detection unit 33a calculates luminance change along the edge line in question. The three-dimensional object detection unit 33a calculates luminance changes of edge lines in accordance with any of the aforementioned formulas 4, 5, and 6. Next, in step S313, the three-dimensional object detection unit 33a excludes from among the edge lines any edge lines in which the luminance change is equal to or greater than a predetermined threshold value tb. Specifically, edge lines having large luminance change are assessed as not being correct edge lines, and these edge lines are not used for detection of three-dimensional objects. The reason for doing so, as described above, is to minimize instances in which characters on the road surface, roadside vegetation, and the like included in the detection area A1 are detected as being edge lines. Therefore, the predetermined threshold value tb will be a value derived in advance through experimentation or the like, set based on luminance changes observed to occur due to characters on the road surface, roadside vegetation, and the like. On the other hand, the three-dimensional object detection unit 33a assesses that, of the edge lines, edge lines having luminance change that is less than the predetermined threshold value tb are edge lines of three-dimensional objects, and thereby detects a three-dimensional object present in an adjacent lane.

Next, in step S314, an assessment is made by the three-dimensional object detection unit 33a as to whether the quantity of edge lines is equal to or greater than a predetermined threshold value β. Here, the threshold value β is a value determined in advance through experimentation or the like. In cases in which, for example, four-wheeled vehicles have been set as the three-dimensional objects to be detected, the threshold value β in question is established through experimentation or the like in advance, doing so based on the number of edge lines of a four-wheeled vehicle appearing within the detection area A1. In the event of an assessment that the quantity of edge lines is equal to or greater than a predetermined threshold value β (step S314=Yes), the three-dimensional object assessment unit 33a assesses that a three-dimensional object is present within the detection area A1, the routine advances to step S315, and it is assessed that an adjacent vehicle is present. On the other hand, in the event of an assessment that the quantity of edge lines is not equal to or greater than a predetermined threshold value β (step S314=No), the three-dimensional object assessment unit 33a assesses that no three-dimensional object is present within the detection area A1, the routine advances to step S316, and it is assessed that no adjacent vehicle is present within the detection area A1.

Figure 21:
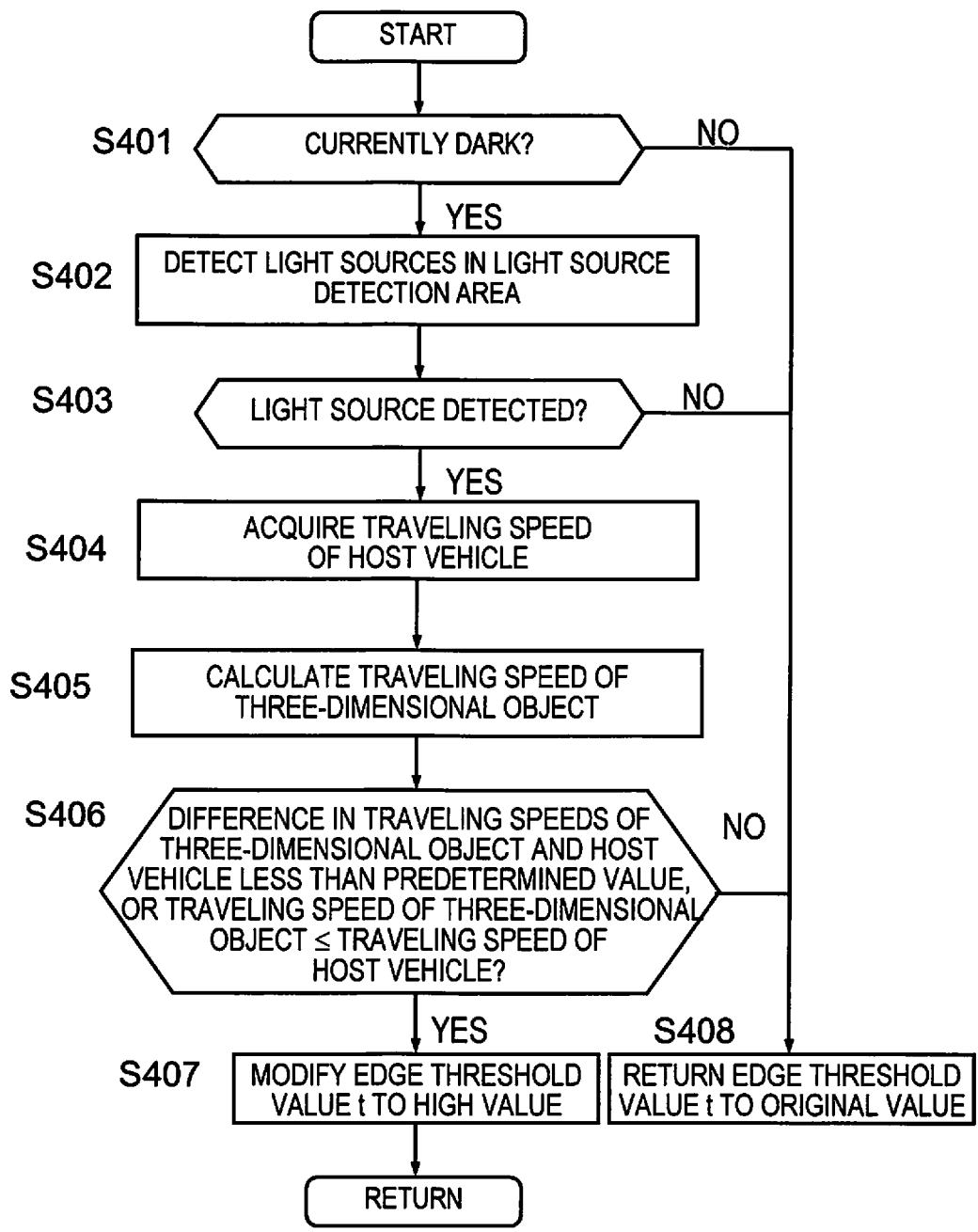
FIG. 21 is a flowchart illustrating a threshold value modification process according to the second embodiment.

Next, the threshold value modification process according to the second embodiment will be described with reference to FIG. 21. As in the first embodiment, the threshold value modification process according to the second embodiment is carried out in parallel with the adjacent vehicle detection process illustrated in FIG. 20. The threshold value modification process according to the second embodiment involves modifying the edge threshold value t used to detect three-dimensional objects, doing so in order that the adjacent vehicle V2 can be detected appropriately, even in cases in which mud or other foreign matter is deposited on the lens. For this reason, in this threshold value modification process, the modified edge threshold value t is employed during detection of edges of the adjacent vehicle V2 in the adjacent vehicle detection process illustrated in FIG. 20. FIG. 21 is a flowchart illustrating the threshold value modification process according to the second embodiment.

As shown in FIG. 21, in steps S401-S404, a process similar to that of steps S201-S204 of the first embodiment is carried out. Specifically, first, an assessment is made as to whether it is currently dark, and in the event that an assessment of darkness has been made (step S401=Yes), detection of a light source corresponding to a headlight of the adjacent vehicle V2 is carried out in the light source detection area shown in FIG. 11 (step S402). Then, in the event that no light source corresponding to a headlight of the adjacent vehicle V2 was detected (step S403=No), the traveling speed of the host vehicle V1 is acquired (step S404). In the event that an assessment of darkness was not made (step S401=No), or a light source corresponding to a headlight of the adjacent vehicle V2 was detected (step S403=Yes), the routine advances to Step S408.

Then, in step S405, the traveling speed of the detected three-dimensional object is calculated by the three-dimensional object detection unit 33a. In specific terms, based on edge lines of the three-dimensional object, the three-dimensional object detection unit 33a generates a one-dimensional edge waveform $EW_t$, and from temporal change of the edge waveforms $EW_t$, $EW_{t-1}$, calculates the travel distance of the three-dimensional object at a predetermined time, and through temporal differentiation of the calculated travel distance of the three-dimensional object, calculates the traveling speed of the three-dimensional object.

In step S406, the threshold value modification unit 36a carries out a comparison of the traveling speed of the host vehicle V1 and the traveling speed of the three-dimensional object, and makes an assessment as to whether the traveling speed of the three-dimensional object is equal to or less than the traveling speed of the host vehicle V1, or the difference between the traveling speed of the three-dimensional object and the traveling speed of the host vehicle is less than the predetermined value ΔV. In the event that either condition is met, it is assessed that the three-dimensional object detected by the three-dimensional object detection unit 33 is not the adjacent vehicle V2 attempting to pass the host vehicle V1, and the value of the edge threshold value t is modified to a high value (step S407). On the other hand, in the event that neither condition is met, it is assessed that the three-dimensional object detected by the three-dimensional object detection unit 33 is the adjacent vehicle V2 attempting to pass the host vehicle V1, and the value of the adjacent vehicle V2 is restored to the original value, in order to appropriately detect the adjacent vehicle V2 (step S408).

In the above manner, according to the second embodiment, the edges of the adjacent vehicle V2 are detected, and in the event that, when carrying out detection of the adjacent vehicle V2 based on the edges in question, an assessment of darkness has been made by the darkness assessment unit 34, and moreover no light source corresponding to a headlight of the adjacent vehicle V2 has been detected by the light source detection unit 35, the edge threshold value t is modified to a high value, in cases in which the traveling speed of the three-dimensional object is equal to or less than the traveling speed of the host vehicle V1, or the difference between the traveling speed of the three-dimensional object and the traveling speed of the host vehicle is less than the predetermined value ΔV, in order to suppress detection of three-dimensional objects. In so doing, in the second embodiment, in addition to the advantageous effects of the first embodiment, even in cases in which mud or other foreign matter has been deposited on the lens during detection of the adjacent vehicle V2 based on the edges, errant detection of the foreign matter as the adjacent vehicle V2 can be effectively prevented, and it will be possible to appropriately detect the adjacent vehicle V2.

The embodiments described above are shown in order to facilitate understanding of the present invention, and are not shown in order to limit the present invention. Therefore, the elements disclosed in the embodiments above are intended to include all design modifications and equivalents thereto that lie within the technical range of the present invention.

For example, the embodiments presented above showed exemplary configurations in which, in the event that an assessment of darkness has been made, and moreover no light source corresponding to a headlight of the adjacent vehicle V2 has been detected, the difference threshold value th or the edge threshold value t is modified to a high value, in cases in which the traveling speed of the three-dimensional object is equal to or less than the traveling speed of the host vehicle V1, or the difference between the traveling speed of the three-dimensional object and the traveling speed of the host vehicle is less than a predetermined value. However, there is no limitation to this particular configuration, and a configuration in which, for example, a threshold value α or a threshold value β for detecting three-dimensional objects is modified to a high value instead of the difference threshold value th or the edge threshold value t, or in addition to the difference threshold value th or the edge threshold value t, or a configuration in which a threshold value θ or a threshold value t2 detecting three-dimensional objects is modified to a high value, would also be acceptable. In so doing, even in cases in which mud or other foreign matter has been deposited on the lens of the camera 10, instances in which the mud or other foreign matter is misdetected as the adjacent vehicle V2 can be effectively prevented. Additionally, a configuration in which, instead of modifying the difference threshold value th or the edge threshold value to a high value, the pixel values (or luminance values) output by the camera 10 are lowered, would also be acceptable. In this case, due to the greater difficulty in detecting difference pixels DP or edges, detection of three-dimensional objects (the adjacent vehicle V2) is suppressed, making it possible to effectively prevent mud or other foreign matter from being misdetected as the adjacent vehicle V2.

Further, whereas the embodiments presented above showed exemplary configurations in which a three-dimensional object is detected as being the adjacent vehicle V2 in the event that the traveling speed of the three-dimensional object meets predetermined conditions, a configuration in which, for example, instead of modifying the difference threshold value th or the edge threshold value t to a high value, the aforementioned conditions are made more stringent, to thereby suppress detection of the adjacent vehicle V2, would also be acceptable. For example, in the embodiments discussed above, a three-dimensional object was assessed to be the adjacent vehicle V2 in cases in which the absolute traveling speed of the three-dimensional object is 10 km/hr or above, and the relative traveling speed of the three-dimensional object in relation to the host vehicle V1 is +60 km/h or less; however, a configuration in which, in the event that an assessment of darkness has been made, and moreover no light source corresponding to a headlight of the adjacent vehicle V2 has been detected, and additionally the traveling speed of the three-dimensional object is equal to or less than the traveling speed of the host vehicle V1, or the difference between the traveling speed of the three-dimensional object and the traveling speed of the host vehicle is less than a predetermined value, the three-dimensional object is assessed to be the adjacent vehicle V2 in cases in which, e.g., the absolute traveling speed of the three-dimensional object is 20 km/hr or above, and the relative traveling speed of the three-dimensional object in relation to the host vehicle V1 is +50 km/h or less, would also be acceptable.

Figure 22:
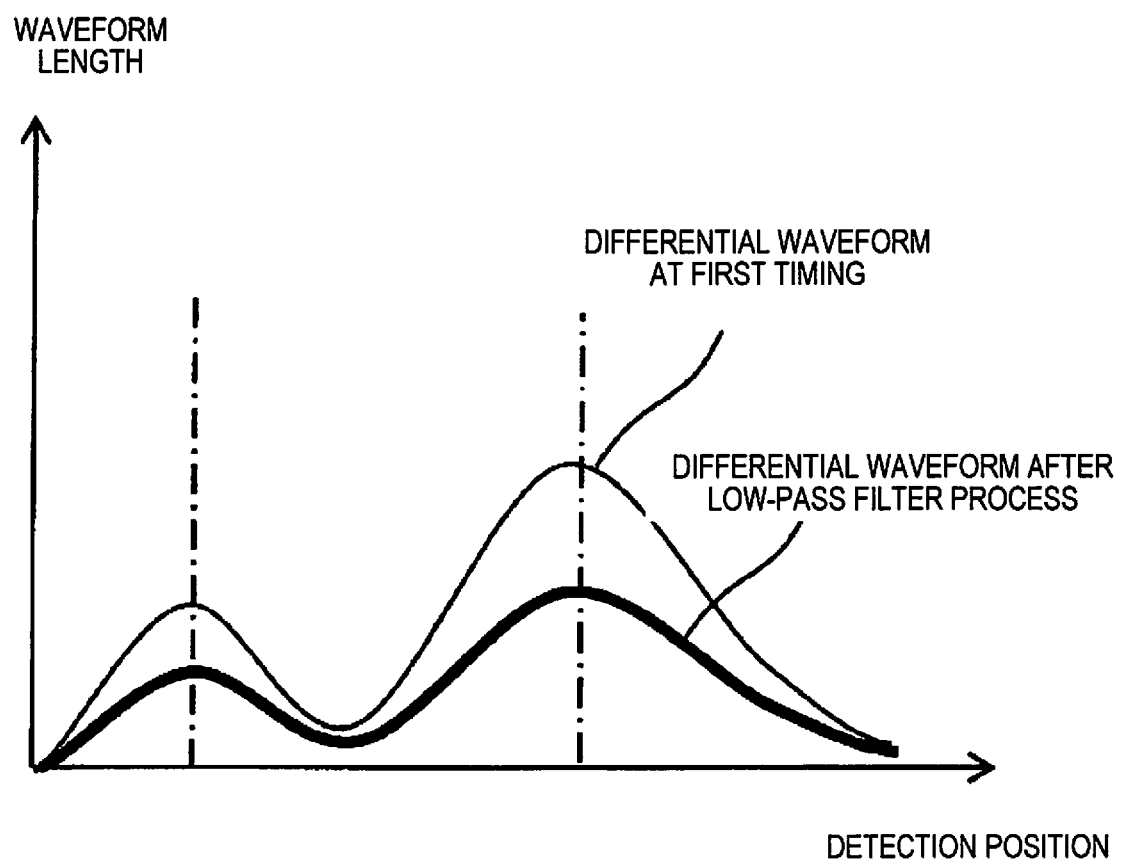
FIG. 22 is a first view (part 1) illustrating a map for a method for detecting foreign matter.
Figure 23:
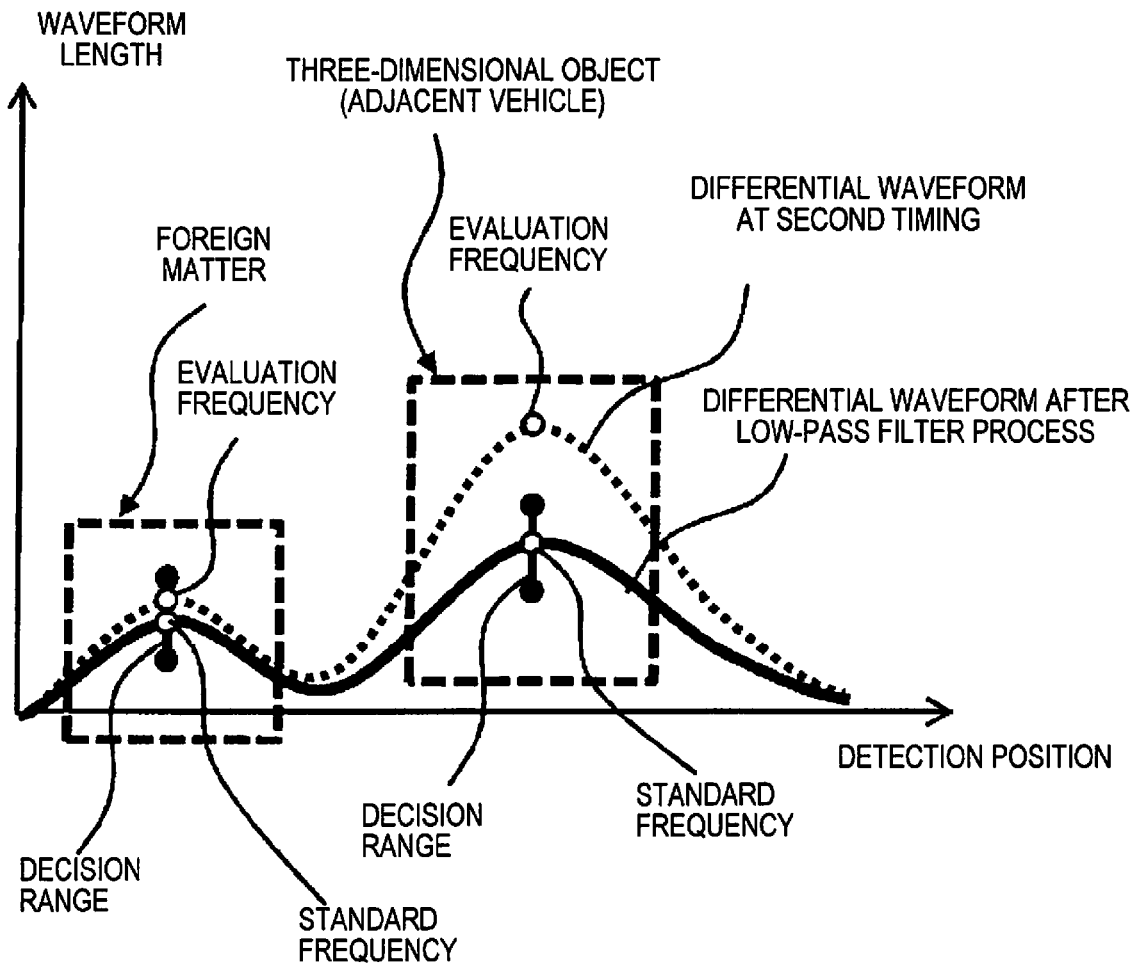
FIG. 23 is a second view (part 2) illustrating a map for the method for detecting foreign matter.

In addition to the embodiments presented above, there can be adopted a configuration provided with a foreign matter detection unit for detecting foreign matter deposited on the lens, whereby, based on detection results from the foreign matter detection unit, it is assessed whether mud or other foreign matter has been deposited on the lens; and the threshold value modification process discussed above is carried out in cases in which it is assessed that mud or other foreign matter has been deposited on the lens. FIGS. 22 and 23 are views describing a method for detecting foreign matter deposited on the lens.

In specific terms, as shown in FIG. 22, the foreign matter detection unit executes a low-pass filter (high-cut filter) process to cut off or attenuate high-frequency components, on a differential waveform $DW_t$ generated at predetermined timing t1. By carrying out a low-pass filter process on the differential waveform $DW_t$ in this manner, the differential waveform $DW_t$ can be smoothed and averaged. Specifically, by carrying out a low-pass filter process on the differential waveform $DW_t$, small local maxima that can be assessed as representing noise can be eliminated from the differential waveform $DW_t$, revealing local maxima that exhibit relatively large change, and allowing features to be extracted from the acquired image information. As a result, local maxima of the differential waveform $DW_t$ due to the presence of foreign matter deposited on the lens can be revealed, and features corresponding to the foreign matter in the acquired image information can be can be extracted.

Next, as shown in FIG. 23, the local maxima of the differential waveform $DW_t$ subsequent to the low-pass filter process are calculated as a standard frequency by the foreign matter detection unit, and based on this standard frequency, an assessment range for the purpose of assessing whether foreign matter is present is established. For example, the foreign matter detection unit establishes, as an assessment range, a range extending from a value obtained by adding a predetermined margin value to the standard frequency, to a value obtained by subtracting a predetermined margin value from the standard frequency. The standard frequency is not limited to the local maxima of the differential waveform $DW_t$ subsequent to the low-pass filter process, and the standard frequency can be calculated, e.g., based on local maxima of the differential waveform $DW_t$ subsequent to the low-pass filter process, such as a value which is greater by a predetermined value than a local maximum of the differential waveform $DW_t$.

As shown in FIG. 23, the foreign matter detection unit then acquires, by way of an evaluation frequency, a local maximum of a differential waveform $DW_t$ newly generated at one or a plurality of second timings t2 following the first timing t1, and counts up the number of instances in which the difference between the standard frequency and the evaluation frequency at shared positions on the bird's-eye view image is assessed to lie within the assessment range. The foreign matter detection unit then repeats the aforedescribed foreign matter detection process within a previously defined, predetermined observation period, and in the event that the number of instances counted up is equal to or greater than a predetermined number of instances tc, assesses that the image containing pixels that correspond to the evaluation frequency derived as a result of the count up represents foreign matter deposited on the lens.

In this way, by having the foreign matter detection unit count up the number of instances in which the difference between the standard frequency and the evaluation frequency on the bird's-eye view image have been assessed to lie within the assessed range, it is possible to detect mud or other foreign matter, deposited on the lens, when the foreign matter firmly adheres to the lens and does not move. In this manner, by carrying out the threshold modification process discussed above, only in cases in which foreign matter has been detected, the processing load can be reduced in cases in which no foreign matter is deposited on the lens.

The foreign matter detection process by the foreign matter detection unit can also be carried out based on edge information. The foreign matter detection unit extracts a first local maxima from edge information that includes information about edge lines generated by the three-dimensional detection unit 33 at one or a plurality of first timings, as well as acquiring a reference edge length based on this first local maxima. The edge line information includes information (including the number of pixels) about the length of an edge exhibiting a luminance difference equal to or greater than a predetermined threshold value, and having predetermined continuity. From edge information newly generated at one or a plurality of second timings following the first timing, the foreign matter detection unit extracts a second local maxima corresponding to the first local maxima on the bird's-eye view image, as well as acquiring an evaluation edge length based on this second local maxima. Then, based on temporal change in the difference between the evaluation edge length and the reference edge length, it is detected whether foreign matter has been deposited on the lens. The definition of "temporal change" is the same as the definition of "temporal change" in the process based on difference wave information.

In the event of an assessment that the extent of temporal change in the difference between the evaluation edge length and the reference edge length lies within a predetermined decision range, the foreign matter detection unit assesses that an image containing pixels that correspond to the reference edge length is an image caused by foreign matter deposited on the lens, and detects that foreign matter is deposited on the lens.

In specific terms, the foreign matter detection unit carries out signal processing which employs at least a band-pass filter, on edge information containing an edge line generated at a first timing, and based on a "local maxima of standard edge information" subsequent to this signal processing, acquires a "reference edge length." Then, based on the local maxima of edge information newly generated at one or a plurality of second timings following the first timing, an "evaluation edge length" is acquired, and based on the number of instances in which the difference between the reference edge length and the evaluation edge length at shared positions on the bird's-eye view image is assessed to lie within a "predetermined decision range," assesses that an image that includes pixels corresponding to the evaluation edge length is an image caused by foreign matter deposited on the lens. This assessment can be carried out within a previously defined, predetermined evaluation interval. The feature and working effects of utilizing a low pass filter as the band-pass filter, and the feature and working effects of being able to modify the cutoff/attenuation band of the low pass filter according to the state of detection of foreign matter, are the same as those described previously, and therefore reference is made to that description. The "standard edge information" in the foreign matter detection process based on edge information corresponds to the "standard differential waveform information" mentioned previously, the "reference edge length" to the "reference value" mentioned previously, the "evaluation edge length" to the "evaluation target value" mentioned previously, and the "predetermined assessment range" for evaluating the "evaluation edge length" to the "predetermined assessment range" for evaluating the "evaluation target value" in the process employing the standard waveform information mentioned previously.

In the preceding embodiments, there was shown an exemplary configuration in which the darkness assessment unit 34 assesses whether it is dark based on captured images captured by the camera 10, but there is no limitation to this configuration, and a configuration in which the assessment as to whether it is dark is made, e.g., based on time of day, or the like, would be acceptable.

The camera 10 of the embodiments discussed above corresponds to the image capture means of the present invention; the vehicle speed sensor 20 to the host vehicle speed detection means of the present invention; the viewpoint conversion unit 31 to the image conversion means of the present invention; the alignment unit 32, the three-dimensional object detection unit 33, 33a, the luminance difference calculation unit 37, and the edge line detection unit 38 to the three-dimensional object detection means of the present invention; the darkness assessment unit 34 to the darkness assessment means of the present invention; the light source detection unit 35 to the light source detection means of the present invention; and the threshold modification unit 36, 36a to the control means of the present invention.

The invention claimed is:

1. A three-dimensional object detection device comprising:
   an image capturing unit having a lens for capturing images of an area rearward of a host vehicle;
   a three-dimensional object detection unit programmed to detect a presence of a three-dimensional object in a predetermined detection area, based on the images captured by the image capturing unit, and programmed to calculate a traveling speed of the three-dimensional object;
   a host vehicle speed detection unit programmed to detect the traveling speed of the host vehicle;
   a light source detection unit programmed to detect a headlight light source corresponding to a headlight of another vehicle, within a predetermined light source detection area that includes the detection area; and
   a controller programmed to compare the traveling speed of the three-dimensional object and the traveling speed of the host vehicle upon the headlight light source not being detected by the light source detection unit, and programmed to perform a control process to suppress detection of the three-dimensional object upon determining one of the traveling speed of the three-dimensional object being equal to or less than the traveling speed of the host vehicle, and a difference between the traveling speed of the three-dimensional object and the traveling speed of the host vehicle being less than a predetermined value.

2. The three-dimensional object detection device according to claim 1, further comprising
   a darkness assessment unit programmed to carry out a darkness assessment process to access whether a darkness state exists,
   the controller being programmed to perform the control process, in cases in which an assessment of an existence of the darkness state by the darkness assessment unit.

3. The three-dimensional object detection device according to claim 1, further comprising
   an image conversion unit programmed to perform viewpoint conversion of the images captured by the image capturing unit to bird's-eye view images, and
   the three-dimensional object detection unit being further programmed to detect the presence of the three-dimensional object based on differential waveform information in which the differential waveform information is generated by aligning in bird's-eye view positions of the bird's-eye view images obtained at different points in time by the image capturing unit, and counting a number of pixels that exhibit a predetermined difference on a differential image of aligned bird's-eye view images to produce a frequency distribution, and the three-dimensional object detection unit being further programmed to calculate the traveling speed of the three-dimensional object based on temporal change of a waveform of the differential waveform information.

4. The three-dimensional object detection device according to claim 3, wherein
   the three-dimensional object detection unit being further programmed to count the number of pixels that exhibit the difference equal to or greater than a predetermined first threshold value on the differential image to produce the frequency distribution for generating the differential waveform information, and
   the three-dimensional object detection unit being further programmed to detect the three-dimensional object based on the differential waveform information upon determining a peak value of the differential waveform information is equal to or greater than a predetermined second threshold value; and
   the controller being further programmed to modify one of the the first threshold value and the second threshold value to a higher value, thereby suppressing detection of the three-dimensional object.

5. The three-dimensional object detection device according to claim 3, wherein
   during generation of the differential waveform information by the three-dimensional object detection unit, the controller is further programmed to suppress detection of the three-dimensional object by prompting the three-dimensional object detection unit to output a lower value from the process of counting the number of pixels that exhibit the predetermined difference on the differential image to produce the frequency distribution.

6. The three-dimensional object detection device according claim 3, further comprising
   a foreign matter detection unit programmed to extract a first local maximum from the differential waveform information generated at one or a plurality of first timings by the three-dimensional object detection unit, and acquire a reference value based on the first local maximum that was extracted; extract a second local maximum, corresponding to the first local maximum in the bird's-eye view images, from the differential waveform information newly generated at one or a plurality of second timings following the first timing, and acquire an evaluation target value based on the second local maximum in question; and detect whether foreign matter is deposited on the lens based on a change over time in the difference between the evaluation target value and the reference value;
   the controller is further programmed to suppress detection of the three-dimensional object only upon the foreign matter detection unit having detected foreign matter deposited on the lens.

7. The three-dimensional object detection device according to claim 1, further comprising
an image conversion unit programmed to perform viewpoint conversion of the images captured by the image capturing unit to bird's-eye view images, and
the three-dimensional object detection unit being further programmed to detect the presence of the three-dimensional object based on edge information being detected from the bird's-eye view images obtained from the image conversion unit, and the three-dimensional object detection unit being further programmed to calculate the traveling speed of the three-dimensional object based on temporal change of the edge information.

8. The three-dimensional object detection device according to claim 7, wherein
the three-dimensional object detection unit being further programmed to detect, from the bird's-eye view images, an edge component for which the luminance difference between adjacent pixel areas is equal to or greater than a first threshold value, and
the three-dimensional object detection unit being further programmed to detect the three-dimensional object based on the edge information upon determining an amount of the edge information based on the edge component is equal to or greater than a second threshold value,
the controller being further programmed to suppress detection of the three-dimensional object by modifying one of the first threshold value and the second threshold value to a higher value.

9. The three-dimensional object detection device according to claim 7, wherein
during detection of the edge information by the three-dimensional object detection unit, the controller is further programmed to suppress detection of the three-dimensional object by prompting the three-dimensional object detection unit to output a lower value of the edge information.

10. The three-dimensional object detection device according to claim 7, further comprising
a foreign matter detection it programmed to extract a first local maximum from edge information including information about the edge lines generated at one or a plurality of first timings by the three-dimensional object detection unit, as well as acquiring a reference edge length based on the first local maximum in question; extract a second local maximum, corresponding to the first local maximum in the bird's-eye view images, from edge information newly generated at one or a plurality of second timings following the first timing, and acquire an evaluation edge length based on the second local maximum in question; and, based on a change over time in the difference between the evaluation edge length and the reference edge length, detects whether foreign matter is deposited on the lens;
the controller is further programmed to suppress detection of the three-dimensional object only upon the foreign matter detection unit having detected foreign matter deposited on the lens.

11. The three-dimensional object detection device according to claim 1, wherein
the light source detection unit is further programmed to repeatedly detect light sources in the light source detection area, and, upon the headlight light source having been detected within a predetermined time interval, outputs a detection result indicating that the headlight light source was detected, and upon the headlight light source not being detected within the predetermined time interval, outputs a detection result indicating that the headlight light source was not detected.

12. The three-dimensional object detection device according to claim 2, wherein
the darkness assessment unit is further programmed to repeatedly carry out the darkness assessment process for detecting light sources in an area different from the light source detection area, to thereby make the assessment as to the existence of the darkness state, and, upon a predetermined amount or more of light sources are detected within a predetermined assessment time interval, makes an assessment of the existence of the darkness state.

13. A three-dimensional object detection method comprising:
performing viewpoint conversion to bird's-eye view images of images captured by an image capturing unit of an area rearward of a host vehicle;
generating differential waveform information from the bird's-eye view images taken at different points in time;
detecting a presence of a three-dimensional object in a predetermined detection area based on the differential waveform information;
determining whether the three-dimensional object is another vehicle by calculating a traveling speed of the three-dimensional object from temporal change of a waveform of the differential waveform information;
detecting a headlight light source corresponding to a headlight of the other vehicle in a predetermined light source detection area that includes the predetermined detection area;
carrying out a darkness assessment process to access an existence of a darkness state, while making an assessment as to the existence of the darkness state, and in a case in which there is an assessment of the existence of the darkness state and additionally the headlight light source has not been detected, the traveling speed of the three-dimensional object and the traveling speed of the host vehicle are compared; and
suppressing an action deciding that the three-dimensional object is the other vehicle upon determining one of the traveling speed of the three-dimensional object is equal to or less than the traveling speed of the host vehicle, and a difference between the traveling speed of the three-dimensional object and the traveling speed of the host vehicle is less than a predetermined value.

14. A three-dimensional object detection method comprising:
performing viewpoint conversion to bird's-eye view images of images captured by an image capturing unit of an area rearward of a host vehicle;
detecting edge information from the bird's-eye view images;
detecting a presence of a three-dimensional object in a predetermined detection area based on the edge information;
determining whether the three-dimensional object is another vehicle by calculating a traveling speed of the three-dimensional object from temporal change of a waveform of the edge information to decide;
detecting a headlight light source corresponding to a headlight of the other vehicle in a predetermined light source detection area that includes the predetermined detection area;
carrying out a darkness assessment process to access an existence of a darkness state, while making an assessment as to the existence of the darkness state, and in a case in which there is an assessment of the existence of the darkness state and additionally the headlight light source has not been detected, the traveling speed of the three-dimensional object and the traveling speed of the host vehicle are compared; and suppressing an action deciding that the three-dimensional object is the other vehicle upon determining one of the traveling speed of the three-dimensional object is equal to or less than the traveling speed of the host vehicle, and a difference between the traveling speed of the three-dimensional object and the traveling speed of the host vehicle is less than a predetermined value.

\* \* \* \* \*